US009057999B2

(12) United States Patent
Nakatani et al.

(10) Patent No.: US 9,057,999 B2
(45) Date of Patent: Jun. 16, 2015

(54) IMAGE FORMING APPARATUS CAPABLE OF PRINTING AT A PLURALITY OF SPEEDS

(71) Applicant: KYOCERA Document Solutions Inc., Osaka (JP)

(72) Inventors: Ryusuke Nakatani, Osaka (JP); Yoshiaki Ikebata, Osaka (JP); Yumi Hirobe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/251,441

(22) Filed: Apr. 11, 2014

(65) Prior Publication Data

US 2014/0320902 A1 Oct. 30, 2014

(30) Foreign Application Priority Data

Apr. 25, 2013 (JP) ................................ 2013-092891

(51) Int. Cl.
*G06F 3/12* (2006.01)
*G03G 15/00* (2006.01)

(52) U.S. Cl.
CPC .................................... *G03G 15/502* (2013.01)

(58) Field of Classification Search
CPC ............ H04N 1/0044; H04N 1/00466; H04N 1/00488
USPC ................................................. 358/1.1–3.29
See application file for complete search history.

(56) References Cited

U.S. PATENT DOCUMENTS

2013/0208291 A1* 8/2013 Ikeda .......................... 358/1.13

FOREIGN PATENT DOCUMENTS

JP 2004-167798 A 6/2004

* cited by examiner

*Primary Examiner* — Marcellus Augustin
(74) *Attorney, Agent, or Firm* — Stein IP, LLC

(57) ABSTRACT

An image forming apparatus (multifunction peripheral) includes an input portion and a job execution portion. The input portion includes an operation portion configured to accept user's setting input and stop of a job, and a communication portion, so as to accept a content confirmation input of a job to be executed. When executing a job for which the content confirmation input is not accepted, the job execution portion executes the job at lower speed for a predetermined number of sheets from first than a job for which the content confirmation input is accepted, and executes the job at the same speed after the predetermined number of sheets as the job for which the content confirmation input is accepted.

7 Claims, 14 Drawing Sheets

IMAGE FORMING APPARATUS CAPABLE OF PRINTING AT A PLURALITY OF SPEEDS

CROSS-REFERENCE TO RELATED APPLICATION

This application is based upon and claims the benefit of priority from the corresponding Japanese Patent Application No. 2013-092891 filed Apr. 25, 2013, the entire contents of which are incorporated herein by reference.

BACKGROUND OF THE INVENTION

The present disclosure relates to an image forming apparatus capable of changing job execution speed.

An image forming apparatus such as a copier or a multifunction peripheral generates noise when a job is executed. When too large noise is generated from the image forming apparatus, the noise may provide an unpleasant feeling to a user. Therefore, there is an image forming apparatus such as a copier or a multifunction peripheral that can perform printing at a plurality of paper sheet transport speeds. In order to reduce noise generated from the image forming apparatus, a low paper sheet transport speed is used for printing.

As such an image forming apparatus, there is known the following apparatus. Specifically, there is known an image forming apparatus that can transport paper sheets from a paper sheet cassette to an image forming portion at two or more different transport speeds so as to form an image. The image forming apparatus has a low noise mode in which the image forming operation is performed more quietly than in a normal mode. When the low noise mode is selected by switching means, a lower transport speed than in the normal mode is selected among the different transport speeds so as to perform printing.

First, the image forming apparatus is equipped with an operation portion (operation panel) or the like for receiving user's setting operation. Further, the user operates the operation portion so as to set for the job (copy, transmission, or the like) to be executed. For instance, in order to perform double-sided copy, the user makes setting concerning double-sided printing by the operation portion. In this way, the user makes setting of the job to be executed so that a desired result can be obtained.

Then, after setting by the user, a job such as printing or reading document is performed. Here, when there is an omission of setting (of a set value) or a mis-setting by the user, a result of executing the job becomes different from user's desired result. For instance, when there is an omission of setting reduced printing, a print matter is the same size copy as original. Therefore, there is an image forming apparatus that enables to confirm content of the job to be executed before the job is executed (for example, a preview image is displayed).

However, even if a result of the job execution can be confirmed in advance, the user may start the job without the confirmation. For instance, when the user does not know that a result of the job execution can be confirmed in advance, or when the user forgets to confirm, or when the user misunderstands that every necessary items are set, the job may be executed without confirmation of the content.

When the job is executed with the user's desired content (setting) even without confirmation of the content, there is no problem. However, when there is an omission of setting or a mis-setting, the executed job is waste, and there is a problem of wasting paper sheets, electric power, and time. Further, there is a problem that the conventional function of enabling the image forming apparatus to execute the job at a plurality of speeds cannot be utilized when the job whose content has not been confirmed is executed.

The above-mentioned known image forming apparatus has a mode in which operation noise of the image forming apparatus is reduced. However, in this image forming apparatus, a job, which has an omission of setting or a mis-setting because the content is not confirmed, is executed at a speed corresponding to a mode set by the switching means until the end. Therefore, the above-mentioned problem cannot be solved.

SUMMARY OF THE INVENTION

In view of the above-mentioned problem, it is an abject of the present disclosure to reduce a waste of paper sheets, electric power, and time as much as possible, while enhancing productivity of the image forming apparatus, even if a job having an omission of setting or a mis-setting is executed without confirming the content.

An image forming apparatus according to a first aspect of the present disclosure includes an operation portion for accepting a user's setting input and stop of a job under execution, a communication portion for performing data communication with outside, an input portion for accepting a content confirmation input for confirming content of the job to be executed, and a job execution portion configured to execute the job at a lower speed for a predetermined number of sheets from first in executing a job for which the content confirmation input is not accepted by the input portion, than in executing a job for which the content confirmation input is accepted by the input portion, and to execute the job at the same speed after the predetermined number of sheets as in executing the job for which the content confirmation input is accepted by the input portion.

Further features and advantages of the present disclosure will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Now, an embodiment of the present disclosure is described with reference to FIG. 1 to FIG. 17. In the following description, a multifunction peripheral 100 (corresponding to the image forming apparatus), which includes a document reader 1 and a printing portion 2 as job execution portions, is exemplified for the description. However, elements such as a structure and a layout described in this embodiment are merely examples for description and should not be interpreted as limitations of the disclosure.

(Outline of Image Forming Apparatus)

Figure 1:
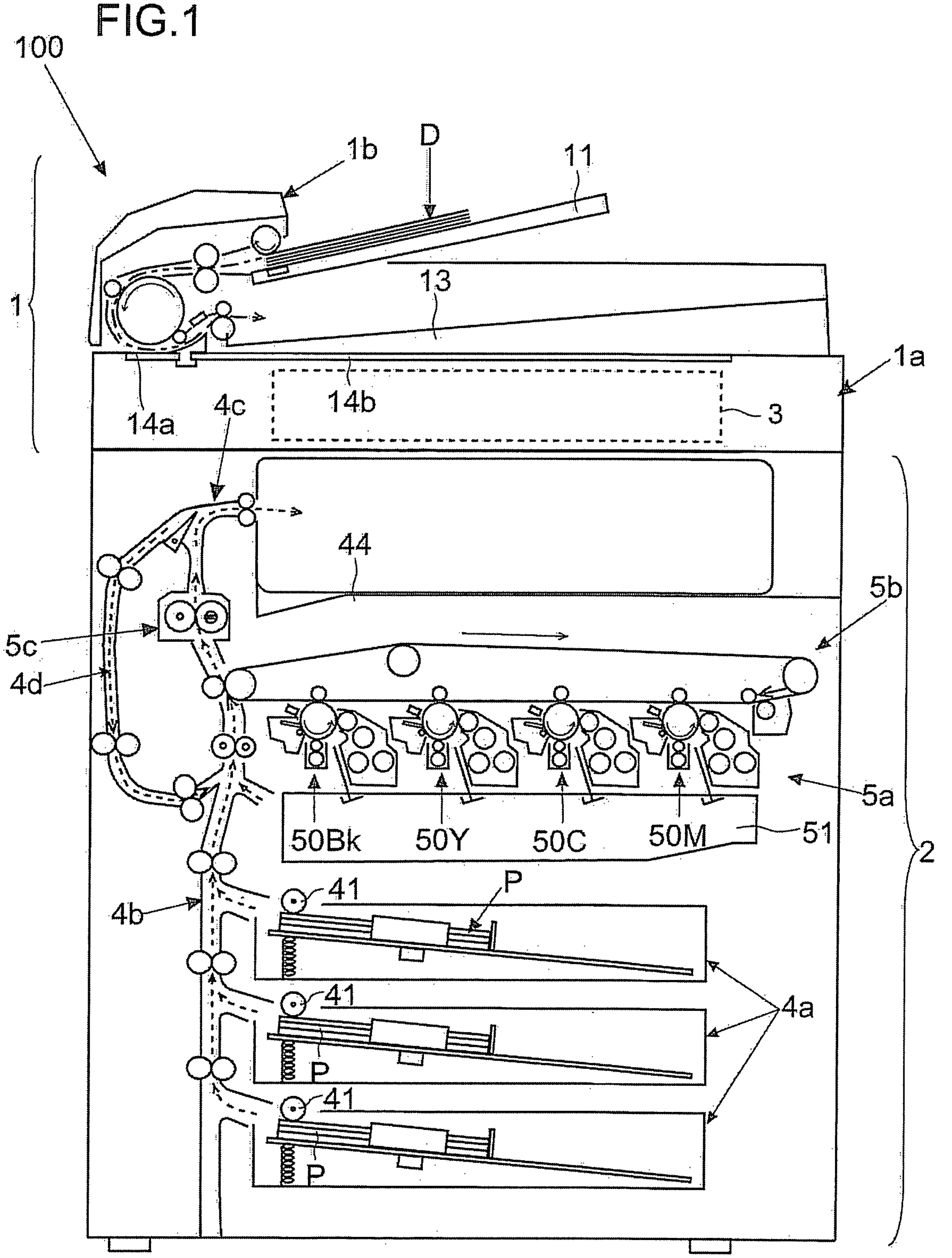
FIG. 1 is a diagram illustrating an example of a multifunction peripheral according to an embodiment.

First, an outline of the multifunction peripheral 100 according to the embodiment is described with reference to FIG. 1. FIG. 1 is a diagram illustrating the multifunction peripheral 100.

As illustrated in FIG. 1, on a front face of the multifunction peripheral 100, there is disposed an operation panel 3 (corresponding to the input portion, operation portion) for performing various settings concerning the multifunction peripheral 100 (details will be described later). As illustrated in FIG. 1, the multifunction peripheral 100 of this embodiment includes the document reader 1 on an upper part, which includes an image reader 1*a* and a document feeder 1*b*. In addition, inside the multifunction peripheral 100, there are disposed paper sheet feeders 4*a*, a transport portion 4*b*, an image forming portion 5*a*, an intermediate transfer portion 5*b*, a fixing portion 5*c*, a discharge transport portion 4*c*, and a double-sided transport portion 4*d*, as the printing portion 2 that transports a paper sheet P and performs printing on the paper sheet P.

Each of the plurality of paper sheet feeders 4*a* stores the paper sheets P used for printing. Each paper sheet feeder 4*a* includes a sheet feed roller 41 driven to rotate. When printing is performed, one of the sheet feed rollers 41 rotates so as to feed the paper sheet P one by one to the transport portion 4*b*. The transport portion 4*b* transports the paper sheet P. The image forming portion 5*a* includes a plurality of image forming units 50 (50Bk for black, 50Y for yellow, 50C for cyan, and 50M for magenta), and an exposing device 51. Each of the image forming units 50 includes a photoreceptor drum, an electrifying device, a developing device, a cleaning device, and the like. The exposing device 51 outputs a laser beam that is turned on and off based on image data so as to scan and expose each photoreceptor drum. A toner image is formed on a circumference surface of the photoreceptor drum by the image forming unit 50 and the exposing device 51.

The intermediate transfer portion 5*b* receives primary transfer of toner images from the image forming units 50 and performs secondary transfer to the sheet. The fixing portion 5*c* fixes the toner image to the paper sheet P. The discharge transport portion 4*c* discharges the paper sheet to a discharge tray 44. In the double-sided printing, the discharge transport portion 4*c* switchbacks the paper sheet P so as to guide a one-side printed paper sheet P to the double-sided transport portion 4*d*.

(Document Reader 1)

Figure 2:
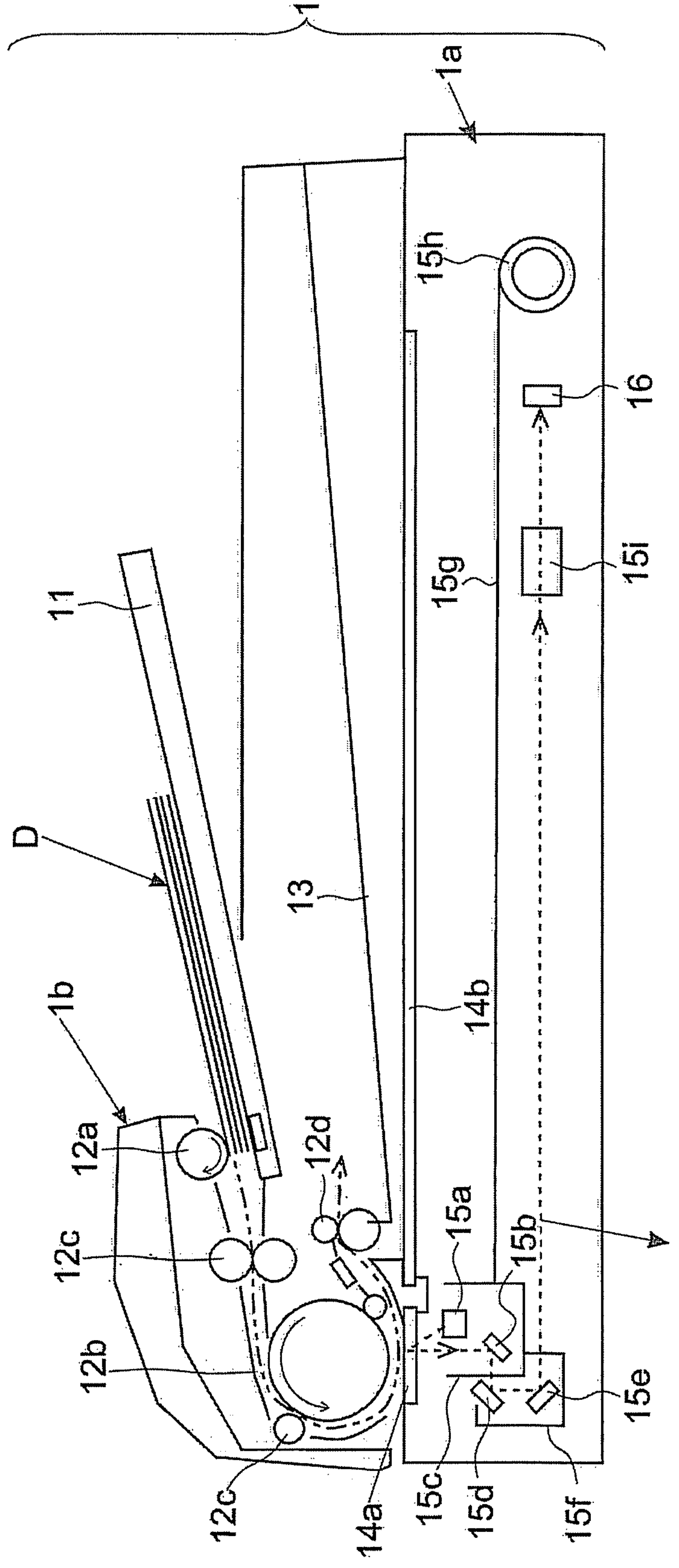
FIG. 2 is a diagram illustrating an example of a document reader according to the embodiment.

Next, with reference to FIG. 2, the document reader 1 according to an embodiment is described. FIG. 2 is a diagram illustrating the document reader 1.

The multifunction peripheral 100 of this embodiment includes the document reader 1 that automatically feeds set document sheets D one by one and reads the document sheets D so as to generate image data. The document reader 1 includes the document feeder 1*b* and the image reader 1*a*.

The document feeder 1*b* is disposed on the upper part of the multifunction peripheral 100. The document feeder 1*b* includes, in order from an upstream side in a document feed direction, a document tray 11, a document sheet feed roller 12*a*, a document feed path 12*b*, a plurality of document feed roller pair 12*c*, a document discharge roller pair 12*d*, a document discharge tray 13, and the like. Further, the document feeder 1*b* automatically and continuously feeds the document sheets D set on the document tray 11 one by one to a feed reading contact glass 14*a* (reading position). Note that the document feeder 1*b* is attached to the image reader 1*a* in a vertically openable and closable manner pivoted at backside of paper of FIG. 1 and FIG. 2, so as to work as a plate pressing the contact glass from above.

Next, the image reader 1*a* according to this embodiment is described. The image reader 1*a* includes the feed reading contact glass 14*a* for reading the fed document sheet D and a place-reading contact glass 14*b* for reading placed document sheet D, which are disposed on the upper face.

In addition, as illustrated in FIG. 2, the image reader 1*a* includes in its casing a first moving frame 15*c* (a lamp 15*a* and a first mirror 15*b*), a second moving frame 15*f* (a second mirror 15*d* and a third mirror 15*e*), a wire 15*g*, a winding drum 15*h*, a lens 15*i*, and an image sensor 16 as optical members. Light from the lamp 15*a* illuminates the document sheet D on the contact glass and finally enters the image sensor 16. The image sensor 16 reads the document sheet D line by line so as to generate image data.

A plurality of the wires 15*g* are attached to the first moving frame 15*c* and the second moving frame 15*f* (only one wire is illustrated in FIG. 2 for convenience sake). A winding motor 15*m* (see FIG. 5) drives the winding drum 15*h* to rotate forward and backward, and hence the first moving frame 15*c* and the second moving frame 15*f* moves in the horizontal direction.

When the document sheet D fed by the document feeder 1*b* are read, the winding motor 15*m* is driven, and then each moving frame is fixed to a position below the feed reading contact glass 14*a* (reading position). On the other hand, when the document sheet D placed on the place-reading contact glass 14*b* is read, the first moving frame 15*c* and the second moving frame 15*f* are moved horizontally to the right in FIG. 2 from a home position by the winding drum 15*h*, the wire

15*g*, and the like, and a scanning operation is sequentially and continuously performed until an end of the document sheet.

Figure 3:
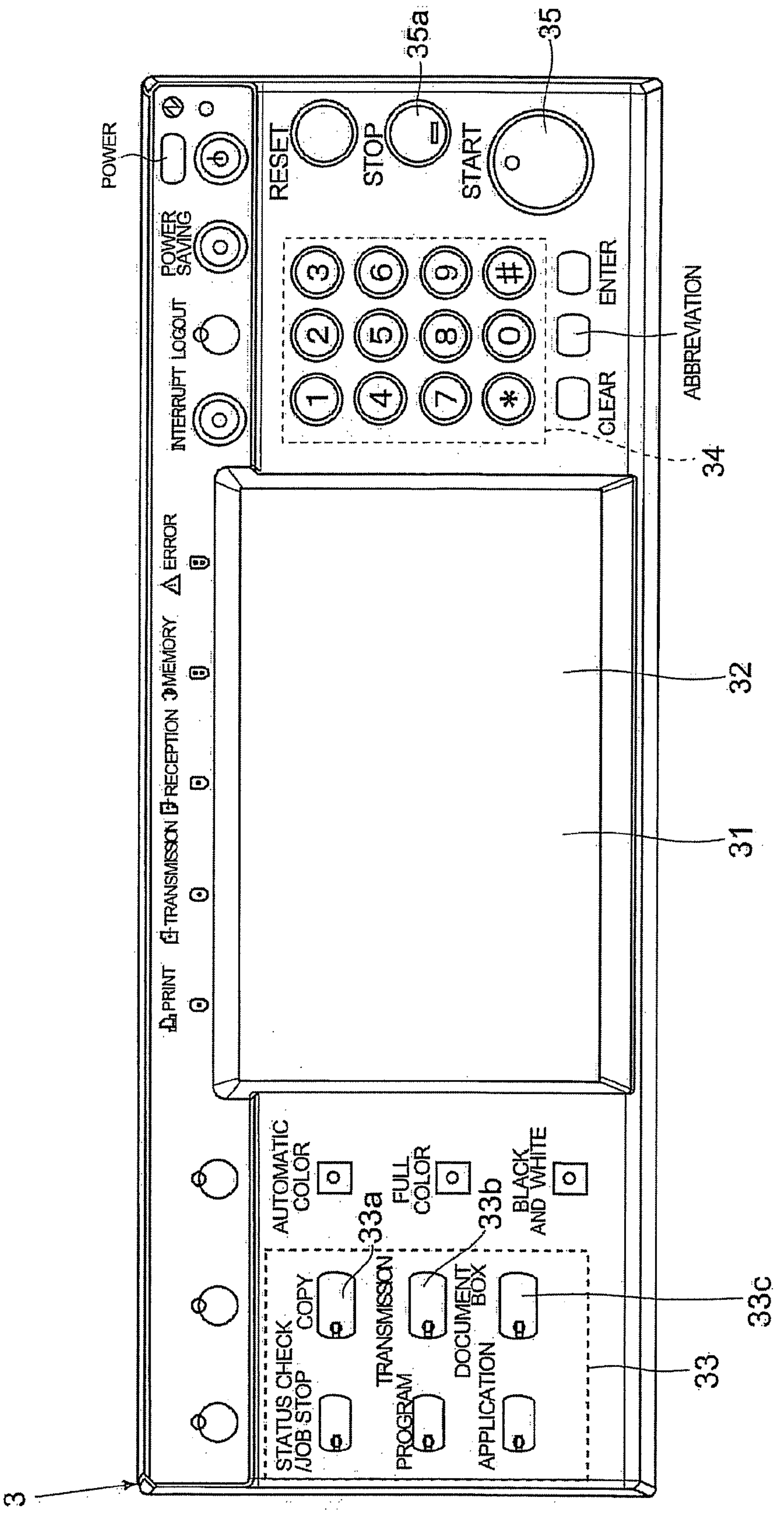
FIG. 3 is a diagram illustrating an example of an operation panel according to the embodiment.

(Operation Panel 3)

i. Next, with reference to FIG. 1 and FIG. 3, an example of the operation panel 3 according to the embodiment is described. FIG. 3 is a diagram illustrating the operation panel 3.

First, the multifunction peripheral 100 has a plurality of functions such as a copy function (copy job), a transmission function (transmission job) for storing data obtained by reading the document sheet D in one of places, and a box function of using image data stored in a storage portion 61 (see FIG. 4) of the multifunction peripheral 100. In other words, the multifunction peripheral 100 has many jobs that can be executed.

For setting these functions, the operation panel 3 is disposed. The operation panel 3 is disposed on the upper front of the multifunction peripheral 100 (see FIG. 1). Further, the operation panel 3 includes a function selection key group 33 including hardware keys such as a copy key 33*a*, a transmission key 33*b*, and a document box key 33*c* for selecting a function to be used. In addition, the operation panel 3 includes a ten-key portion 34 for numeral input, a start key 35 for instructing to start a job (corresponding to the input portion), and the like.

In addition, the operation panel 3 includes a display portion 31. The display portion 31 displays a selection screen of setting items, a setting screen for setting for the selected setting item, and keys for setting set values, so as to use a function (to set a job). In addition, the display portion 31 is a display panel using liquid crystal or organic EL. In addition, a touch panel portion 32 is disposed on the display portion 31 (on the upper surface thereof). The touch panel portion 32 is used for detecting a touch position (coordinates) in an area of the display portion 31. On the basis of an output of the touch panel portion 32, an image, a key, or the like displayed at the touch position is recognized so that a user's operation is accepted.

(Hardware Structure of Multifunction Peripheral 100 and the Like)

Figure 4:
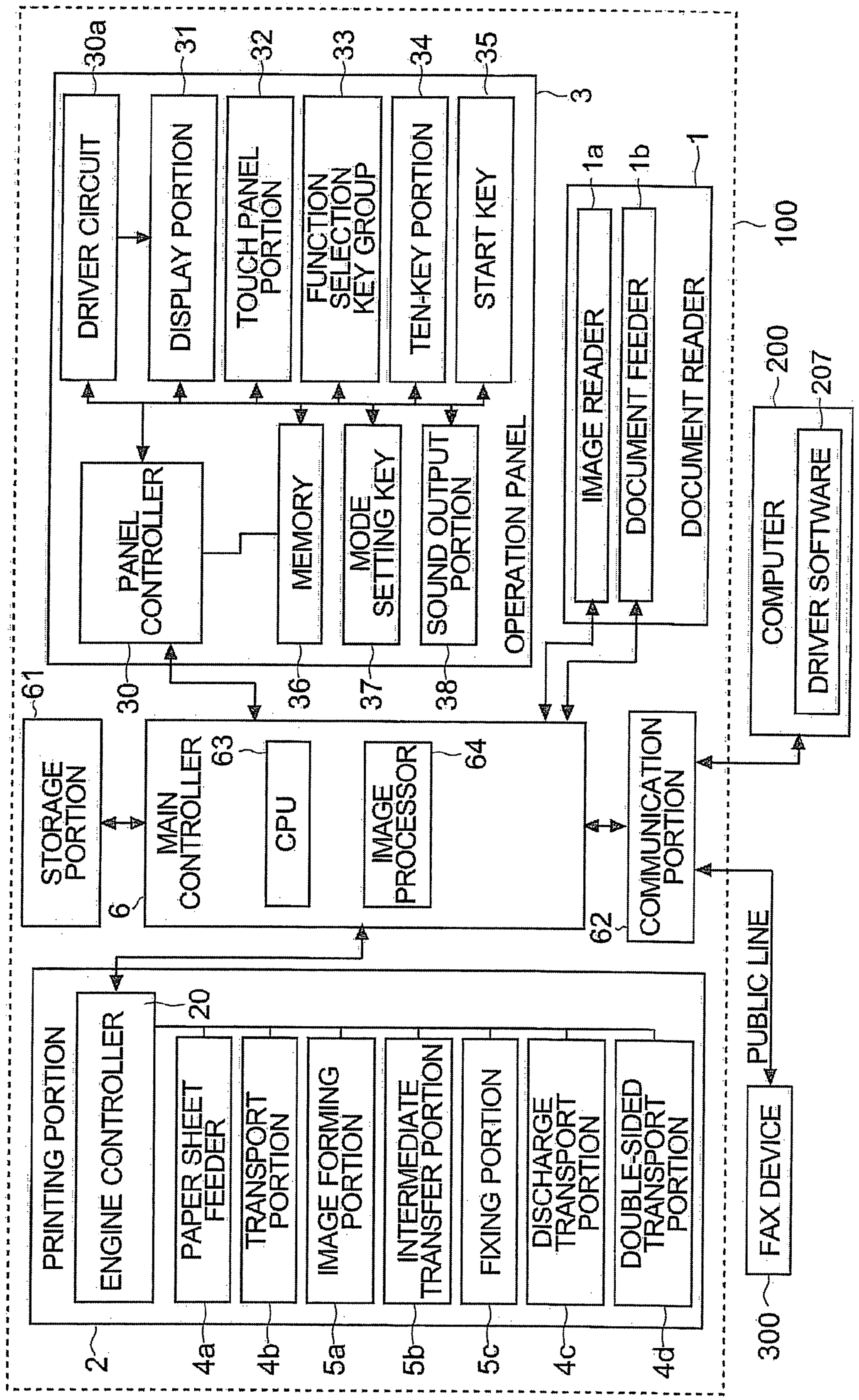
FIG. 4 is a diagram illustrating an example of a hardware structure according to the embodiment multifunction peripheral.

Next, with reference to FIG. 4, an example of a hardware structure of the multifunction peripheral 100 according to an embodiment is described. FIG. 4 is a diagram illustrating a hardware structure of the multifunction peripheral 100.

The multifunction peripheral 100 includes a main controller 6. The main controller 6 is connected to the operation panel 3, the document reader 1, the printing portion 2, the storage portion 61, a communication portion 62 (corresponding to the input portion) and the like, so as to control the multifunction peripheral 100. A CPU 63 of the main controller 6 performs a process such as calculation for control. An image processor 64 performs image processing on the image data obtained by the scanning or received by the communication portion 62, so as to generate image data for printing or transmission.

The storage portion 61 includes nonvolatile and volatile storage elements and devices such as a ROM, a RAM, an HDD, and the like. The storage portion 61 stores data for control, programs, image data, and data concerning setting. The main controller 6 performs control based on the stored content in the storage portion 61. The communication portion 62 performs communication with a computer 200 and a FAX device 300 via a network, a communication line and a cable based on an instruction from the main controller 6. The main controller 6 can control the communication portion 62 to receive image data from the computer 200 and the FAX device 300, and can control the printing portion 2 to perform printing based on the received image data.

In addition, the main controller 6 is connected to the document feeder 1*b* and the image reader 1*a* so as to issue instructions of operation for control. In addition, the main controller 6 is connected to an engine controller 20 that controls the printing portion 2. The engine controller 20 controls operations of the paper sheet feeder 4*a*, the transport portion 4*b*, the image forming portion 5*a*, the intermediate transfer portion 5*b*, the fixing portion 5*c*, the discharge transport portion 4*c*, the double-sided transport portion 4*d*, and the like based on instructions from the main controller 6, and hence the printing is performed. In addition, the main controller 6 recognizes an input performed to the operation panel 3 and controls the multifunction peripheral 100 so that a job is performed in accordance with a user's setting.

The operation panel 3 includes a panel controller 30, a memory 36, a driver circuit 30*a*, the display portion 31, and the touch panel portion 32. The panel controller 30 is constituted of a CPU, an IC, and the like, so as to control a display on the display portion 31. In addition, the panel controller 30 receives an output of the touch panel portion 32, recognizes a touch position at which a key or an image is displayed, and recognizes the input operation. In addition, the panel controller 30 recognizes a touched (pressed) hardware key (the function selection key group 33, the ten-key portion 34, the start key 35, or the like). The panel controller 30 transmits the operation content to the main controller 6 so as to cause the main controller 6 to recognize the operation content.

(Normal Reading Mode and Low-Noise Reading Mode)

Figure 5:
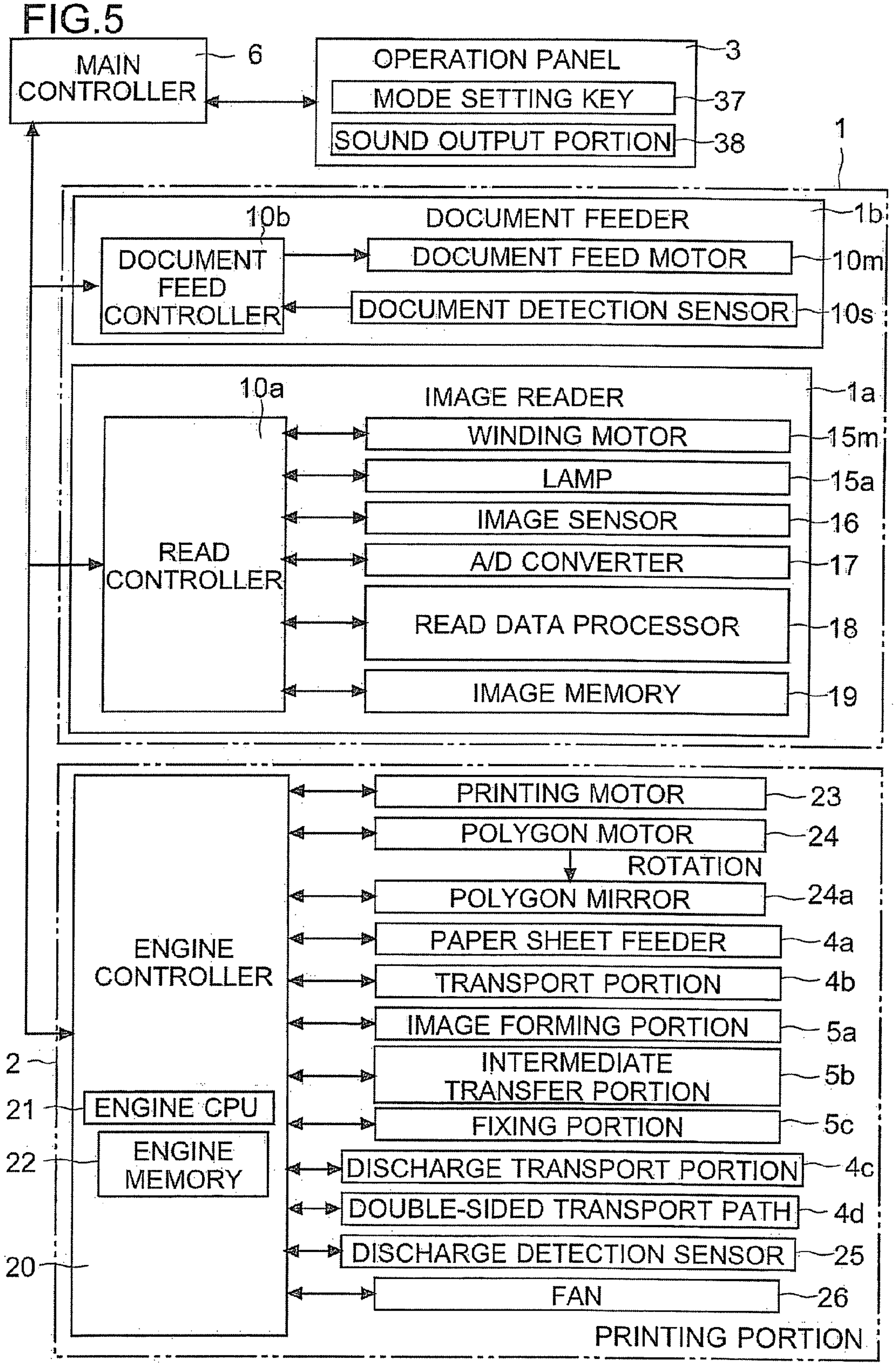
FIG. 5 is an explanatory diagram of a job execution speed in the multifunction peripheral according to the embodiment.

Next, with reference to FIG. 5, there is described a mode concerning reading speed of the document sheets D by the document reader 1 according to an embodiment. FIG. 5 is a diagram for explaining job execution speed.

The document reader 1 of this embodiment has a normal reading mode in which the document sheets D are read at a predetermined normal speed. In other words, the normal reading mode is a mode as specified to read the document sheets D at a predetermined normal job execution speed (for example, the number of read document sheets per minute in specification). In addition, the document reader 1 has a low-noise reading mode in which the document sheets D are read at a low noise speed (second read speed) lower than the normal speed (first read speed) so that the reading speed of the document sheets D is lower than that in the normal reading mode. In other words, the document reader 1 as a job execution portion has a normal mode (the normal reading mode) in which the document sheets D are read at the first read speed (normal speed) and a low noise mode (the low-noise reading mode) in which the document sheets D are read at the second read speed (low noise speed).

In the low-noise reading mode, the reading speed of the document sheets D is reduced. Therefore, it is possible to reduce feeding noise of the document sheets D, noise generated when the document sheet D collides or rubs against a feed guide, rotation noise of a document feed motor 10*m*, and noise generated from the document sheet feed roller 12*a* that rotates when the document sheet is fed or other mechanical elements such as a rotation member or a gear. In other words, it is possible to reduce noise generated from the document reader 1 in the low-noise reading mode more than in the normal reading mode.

The read speed in the low-noise reading mode is appropriately decided within a range of the read speed lower than that in the normal reading mode. Specifically, the reading speed of the document sheets D in the low-noise reading mode can be approximately ½, ⅓, ¾, ⅔, or ⅗ of the read speed in the normal reading mode. In the multifunction peripheral 100 of this embodiment, the read speed in the low-noise reading mode is ½ (a half) of the read speed in the normal reading mode.

It is possible to set which one of the low-noise reading mode and the normal reading mode is used for reading (which mode is used) by the operation panel 3. The operation panel 3 includes a mode setting key 37 for the mode selection. The mode setting key 37 may be disposed as a hardware key or may be displayed as a software key on the display portion 31. The mode setting key 37 accepts the setting of the low-noise reading mode or the normal reading mode for performing reading. Note that when the mode is not set by the mode setting key 37, the document reader 1 performs the reading of the document sheets D at the normal reading mode (default setting is the normal reading mode).

Next, speed control in each reading mode is described. The document feeder 1*b* of the document reader 1 includes a document feed controller 10*b*. The document feed controller 10*b* controls document feeding based on an instruction from the main controller 6. The document feed controller 10*b* is a circuit (substrate) including a CPU, a ROM, a RAM, an IC, and other elements.

In the copy job (printing job using image data based on document reading by the document reader 1) or in the transmission job (for transmitting image data based on document reading by the document reader 1 to the computer 200, the FAX device 300, or the storage portion 61), the document feed controller 10*b* feeds the document sheets D set on the document tray 11 one by one. Note that the document reader 1 includes a document detection sensor 10*s* for detecting whether or not there is a document sheet D on the document tray 11.

Then, the document feed controller 10*b* controls operation of the document feed motor 10*m* for rotating the rotation member for feeding the document sheet D set on the document tray 11. The document feed controller 10*b* controls the rotation speed of the document feed motor 10*m* to be lower (approximately ½) in the low-noise reading mode than in the normal reading mode when reading in the state when it is recognized that there is a document sheet on the document tray 11 based on an output of the document detection sensor 10*s*. Thus, in the low-noise reading mode, the document feed controller 10*b* feeds the document sheets D at a speed of approximately ½ of the speed in the normal reading mode.

In addition, the image reader 1*a* of the document reader 1 includes a read controller 10*a*. The read controller 10*a* controls reading of the document sheets D based on an instruction from the main controller 6. The read controller 10*a* is a circuit (substrate) including a CPU, a ROM, a RAM, an IC, and other elements.

The read controller 10*a* controls rotation speed and rotation direction of the winding motor 15*m* for moving the moving frames (the lamp 15*a* and mirrors). In addition, the read controller 10*a* controls on and off of the lamp 15*a*. The read controller 10*a* turns on the lamp 15*a* when reading the document sheet D and turns off the lamp 15*a* when the reading is finished. In addition, the read controller 10*a* controls operation of the image sensor 16. In addition, the read controller 10*a* controls an A/D converter 17 to generate image data based on an analog output of the image sensor 16. In addition, the read controller 10*a* controls a read data processor 18 to perform image processing for various corrections and adjustments on the image data generated by the A/D converter 17. In addition, the read controller 10*a* controls an image memory 19 to store image data processed by the read data processor 18 and to transmit the image data to the main controller 6 or the storage portion 61.

The read controller 10*a* controls the winding motor 15*m* to operate so that the document sheet D set on the place-reading contact glass 14*b* is read when reading is started in a state where it is recognized that there is no document on the document tray 11 based on the output of the document detection sensor 10*s*. The read controller 10*a* controls the rotation speed of the winding motor 15*m* to be lower (approximately ½) in the low-noise reading mode than in the normal reading mode when performing a job with reading the document sheet D placed on the place-reading contact glass 14*b*. Thus, in the low-noise reading mode, the read controller 10*a* controls the reading speed of the document sheet D to be approximately ½ of that in the normal reading mode.

The read controller 10*a* may control the operation speeds (operation clocks) of the image sensor 16, the A/D converter 17, the read data processor 18, and the image memory 19 for reading in the low-noise reading mode to be lower than those in the normal reading mode (for example, an operation frequency may be set to be approximately ½). Alternatively, the read controller 10*a* may control the image sensor 16, the A/D converter 17, the read data processor 18, and the image memory 19 to operate at the same speed in the normal reading mode and in the low-noise reading mode. In this case, the number of lines in the document feed direction (sub-scanning direction) is larger than that in a predetermined reading resolution. Therefore, the read controller 10*a* controls the read data processor 18 to thin out unnecessary lines.

In this way, the main controller 6 controls the document feed controller 10*b* and the read controller 10*a* to control operations of the document reader 1 (the document feeder 1*b* and the image reader 1*a*) so that the reading is performed at a speed corresponding to the low-noise reading mode and at a speed corresponding to the normal reading mode.

(Normal Print Mode and Low Noise Print Mode)

Next, with reference to FIG. 5, there is described a mode concerning print speed of the printing portion 2 according to an embodiment.

The printing portion 2 of this embodiment has a normal print mode in which printing is performed at a predetermined normal speed. In other words, the normal print mode is a mode as specified to perform printing at a predetermined normal job execution speed (for example, the number of printed sheets per minute in specification). In addition, the printing portion 2 has a low noise print mode in which the printing is performed at a low noise speed lower than the normal speed so that the print speed is lower than that in the normal print mode. In other words, the printing portion 2 as the job execution portion has a normal mode (normal print mode) in which the paper sheet P is printed at a first print speed (normal speed) and a low noise mode (low noise print mode) in which the paper sheet P is printed at a second print speed (low noise speed).

In the low noise print mode, the print speed is reduced. Therefore, it is possible to reduce feeding noise of the paper sheet P, noise generated when the paper sheet P collides or rubs against a feed guide, rotation noise of a printing motor 23, and noise generated from mechanical elements such as rotation members and gears rotating for paper sheet transportation and toner image formation. In other words, it is possible to reduce noise generated from the printing portion 2 in the low noise print mode more than in the normal print mode.

The print speed in the low noise print mode is appropriately decided within a range of the print speed lower than that in the normal print mode. Specifically, the print speed in the low noise print mode can be approximately ½, ⅓, ¾, ⅔, or ⅗ of the print speed in the normal print mode. In the following description, there is described an example in which the print speed in the low noise print mode is ½ (a half) of the print speed in the normal print mode.

It is possible to instruct or select by the operation panel 3 one of the low noise print mode and the normal print mode for performing printing. Therefore, the mode setting key 37 accepts the setting of the low noise print mode or the normal print mode by the operation panel 3 for performing printing. Note that when the mode is not set by the mode setting key 37, the printing portion 2 performs the printing at the normal print mode (default setting is the normal print mode).

Next, speed control in each print mode is described. The printing portion 2 includes the engine controller 20. The engine controller 20 controls the print speed (the number of printed sheets per unit time) based on an instruction from the main controller 6. The engine controller 20 is a circuit (substrate) including a CPU, a ROM, a RAM, an IC, and other elements.

The engine controller 20 controls ON/OFF and rotation speed of the printing motor 23 disposed in the printing portion 2. One or more of the printing motors 23 are disposed. The printing motor 23 rotates rotation members that rotate for printing such as rollers for transporting the paper sheet (various rotation members of the transport portion 4*b* and the paper sheet feeder 4*a*), and rotation members for performing processes concerning toner image formation, transfer, and fixing (rotation members in the image forming portion 5*a*, the intermediate transfer portion 5*b*, the fixing portion 5*c*, and the like). In addition, the engine controller 20 controls ON/OFF and rotation speed of a polygon motor 24 for rotating a polygon mirror 24*a* in the exposing device 51 for performing scanning and exposing of the photoreceptor drum.

In the copy job, the print job (based on data transmitted from the outside), the box print job (based on image data stored in the storage portion 61), the engine controller 20 controls the printing portion 2 to perform printing.

The engine controller 20 controls the rotation speed of the printing motor 23 to be lower (approximately ½) in the low noise print mode than in the normal print mode for printing. In this way, in the low noise print mode, the engine controller 20 sets the print job execution speed to be approximately ½ of the speed in the normal print mode.

In addition, the engine controller 20 may set the rotation speed of the polygon motor 24 to be lower in the low noise mode than in the normal mode for scanning and exposing the photoreceptor drum (for example, frequency of a drive signal supplied to the polygon motor 24 may be set to be approximately ½) as the rotation speed of the photoreceptor drum becomes lower than in the normal mode. Alternatively, the engine controller 20 may set the rotation speed of the polygon motor 24 in the low noise mode to be the same as that in the normal mode while performing scanning and exposing the photoreceptor drum at a ratio of one line out of a few lines in accordance with a deceleration rate (for example, only one line out of two lines is exposed in accordance with the image data).

In this way, the engine controller 20 controls operation of the printing portion 2 so that the printing is performed at speeds corresponding to the low noise print mode and the normal print mode.

(Display of Preview Image when Copy Job is Executed)

Figure 6:
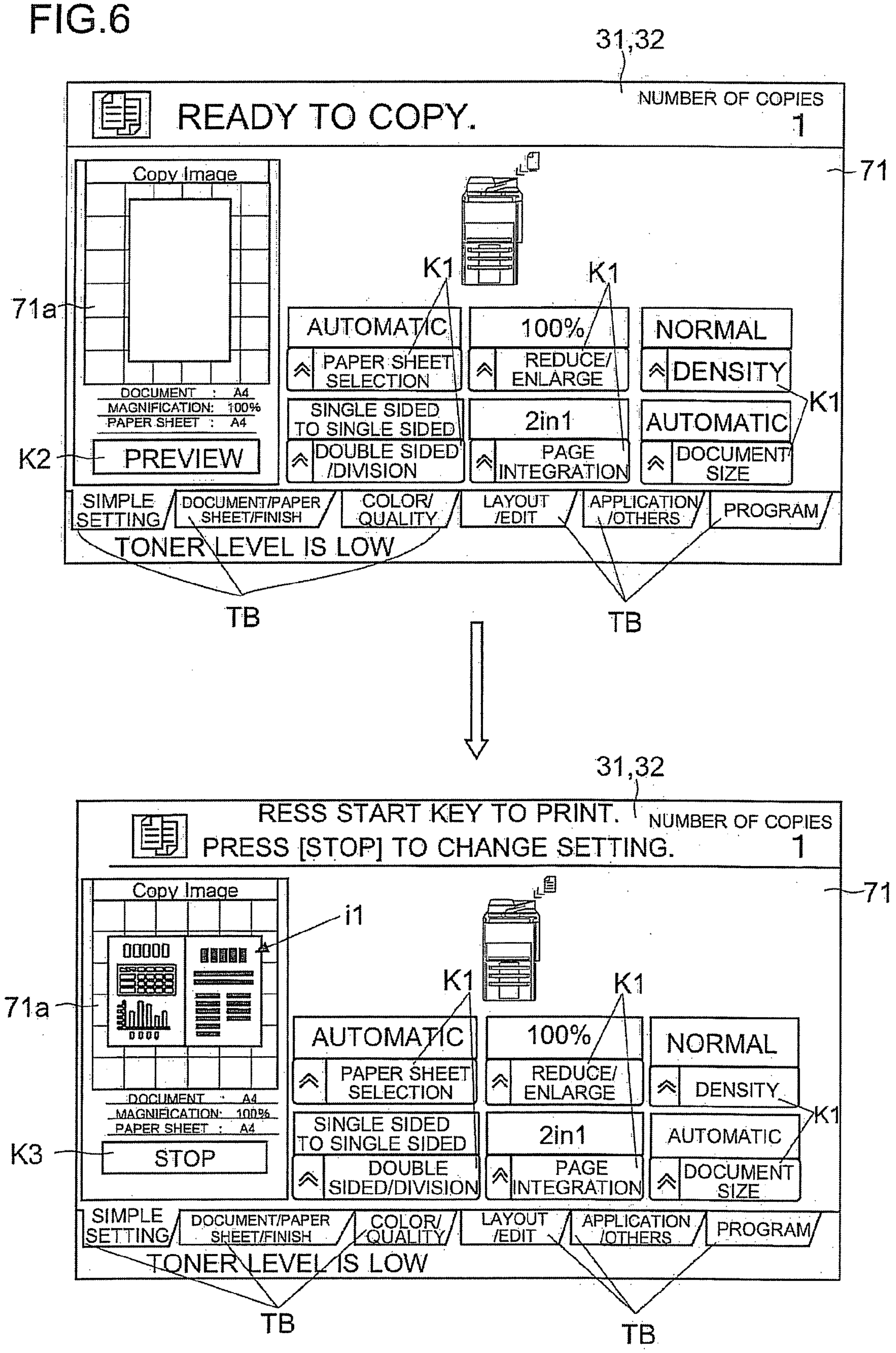
FIG. 6 is an explanatory diagram of a display of a preview image in a copy job according to the embodiment.

Next, with reference to FIG. 6, there is described a display of a preview image when the copy job is executed according to the multifunction peripheral 100 of this embodiment. FIG. 6 is a diagram for explaining a display of a preview image when the copy job is executed.

First, the multifunction peripheral 100 of this embodiment has a copy function in which the document sheet D is read by the document reader 1, and printing is performed based on image data obtained by reading the document sheet D.

In order to execute the copy job, the user presses the copy key 33*a* disposed in the operation panel 3. When recognizing that the copy key 33*a* is pressed, the panel controller 30 controls the display portion 31 to display a copy function basic screen 71 as illustrated in FIG. 6. The basic screen 71 includes selection keys K1 for selecting setting items (paper sheet selection and functions of enlargement/reduction and the like) so as to display the setting screen of the selected setting item.

In addition, the panel controller 30 controls to display a plurality of tubs TB in the basic screen 71. Note that FIG. 6 illuminates a state where a simple setting tub TB is selected. A setting item that can be used in the copy job is assigned to each tub TB in advance (for example, a setting item for density setting and a setting item for print color are assigned to a "color/quality" tub TB). When recognizing that a display position of a tub TB is touched, the panel controller 30 controls the display portion 31 to display a selection screen of setting items assigned to the tub TB (a screen displaying a list of the selection keys K1 for selecting setting items). Note that because many setting items (functions) and set values can be selected in the multifunction peripheral 100 of this embodiment, description of details of the setting items is omitted unless otherwise described.

Further, when recognizing that a display position of a selection key K1 is touched so that a setting item is selected, the panel controller 30 controls the display portion 31 to display a setting screen of the selected setting item. The panel controller 30 accepts (recognizes) an input specifying a set value in the setting screen. For instance, when the setting item for paper sheet selection is selected, the panel controller 30 controls the display portion 31 to display a setting screen for paper sheet selection including set value keys indicating various paper sheet sizes. Further, the panel controller 30 recognizes the paper sheet size assigned to the set value key whose display position is touched as a paper sheet size to be used for printing.

In this way, the operation panel 3 (panel controller 30) accepts settings concerning the job such as setting of the number of copies for printing or setting of a set value of a setting item. The main controller 6 communicates with the operation panel 3 so as to recognize the content of setting by the operation panel 3. Then, the main controller 6 controls the document reader 1 and the printing portion 2 to execute the copy job based on the contents of the user's setting.

Then, the multifunction peripheral 100 of this embodiment can display on the display portion 31 a finished image of a printed matter by the copy job (first preview image i1). In this way, it is possible to confirm the content of the printed matter before starting the printing.

As illustrated in FIG. 6, in a display area of the display portion 31, there is disposed a first preview image display area 71*a* for displaying the first preview image i1. The first preview image display area 71*a* is an area that is assigned fixedly and is displayed also in the setting screen of each setting item of the copy function. Further, a preview key K2 is disposed in the first preview image display area 71*a*. The preview key K2 is used for displaying the first preview image i1 on the display portion 31.

A flow of displaying the first preview image i1 is described. The panel controller 30 recognizes (accepts) a touch operation of the display position of the preview key K2 before starting the copy job execution as an instruction to display the first preview image i1 (preview display instruction or content confirmation input).

When being informed that the preview display instruction is issued by the panel controller 30, the main controller 6 controls the document reader 1 to perform reading of the document sheets D. The document reader 1 reads a first document sheet D for the copy job among a plurality of document sheets D placed on the document tray 11.

The image data generated by reading the document sheets D is stored in the storage portion 61. Further, the image data generated by the document reading has too many pixels to display on the display portion 31. Therefore, the image processor 64 generates image data for displaying the first preview image i1 (preview image data). In this case, the image processor 64 generates preview image data concerning the copy job on which the setting by the operation panel 3 is reflected.

Further, as illustrated in the lower part of FIG. 6, the panel controller 30 controls to display the first preview image i1 in the first preview image display area 71*a* based on the preview image data. Note that as illustrated in the upper part of FIG. 6, a blank image is displayed in the first preview image display area 71*a* before touching the display position of the preview key K2. This blank image is replaced with the first preview image i1.

When there is no problem in the first preview image i1 (having content of the user's intention), the start key 35 is pressed. When the start key 35 is pressed, the main controller 6 controls the document reader 1 to continue reading of the document sheet D and controls the printing portion 2 to perform printing based on image data of the document sheet D (controls the document reader 1 and the printing portion 2 to execute the copy job).

When the first preview image i1 is not the content of the user's intention, the user touches the display position of a stop key K3 disposed in the first preview image display area 71*a*. The stop key K3 is displayed to replace the preview key K2 when the first preview image i1 is displayed. In addition, it is possible to press a stop key 35*a* disposed as a hardware key in the operation panel 3 (see FIG. 3). The panel controller 30 accepts these operations as a preview end instruction.

When the preview end instruction is issued, the panel controller 30 displays the basic screen 71 of the copy job. Then, the user makes setting of a setting item with a mis-setting or an omission of setting. Then, after the setting is changed, when the display position of the preview key K2 is touched, the panel controller 30 controls the display portion 31 to redisplay the first preview image i1 corresponding to setting content after the setting is changed.

(Print Speed Control Corresponding to Presence or Absence of Display of First Preview Image i1)

Figure 7:
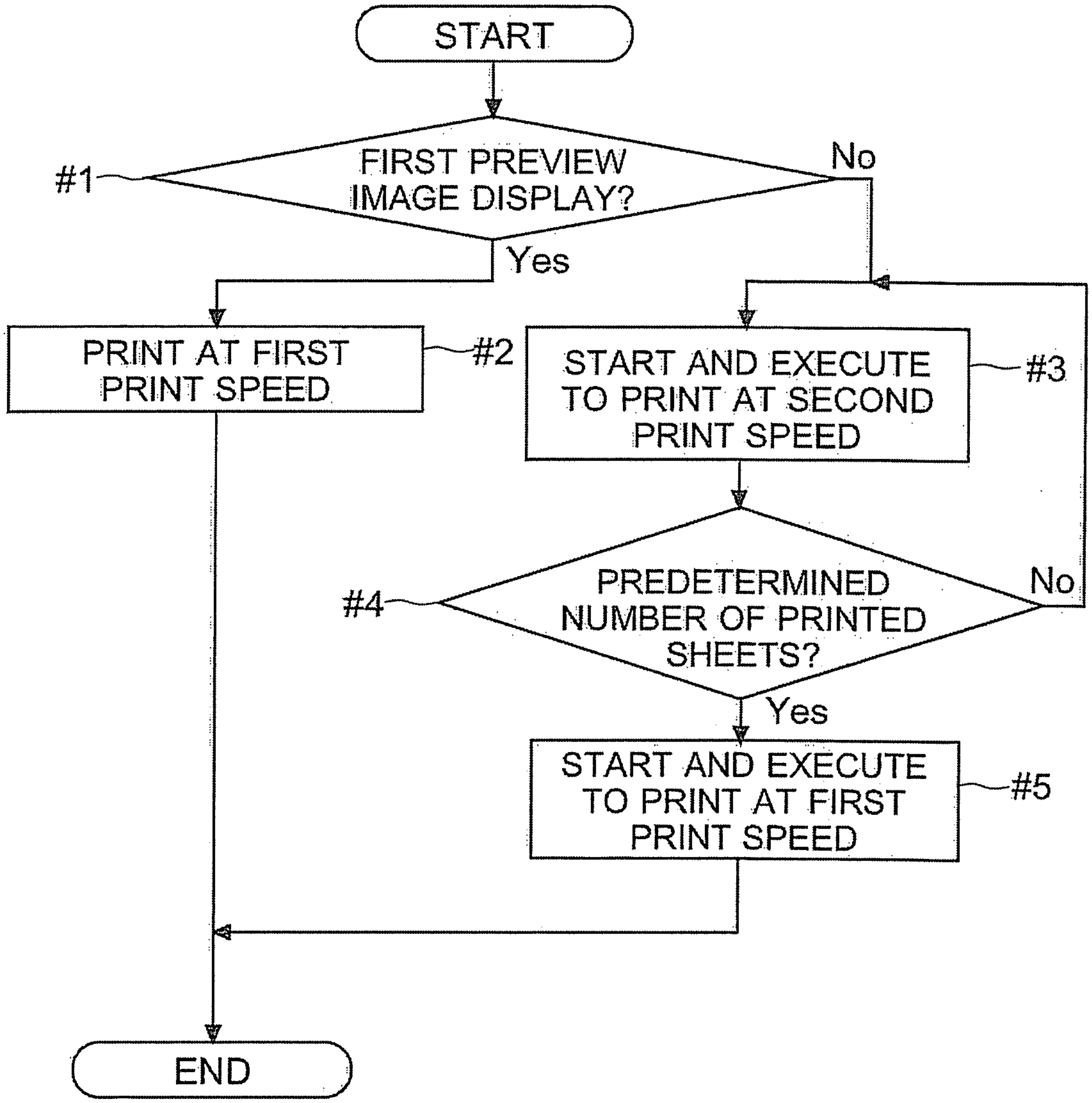
FIG. 7 is a flowchart illustrating an example of a flow of print speed control in accordance with presence or absence of a display of a first preview image according to the embodiment.

Next, with reference to FIG. 7, there is described a flow of print speed control corresponding to whether or not the first preview image i1 is displayed. FIG. 7 is a flowchart illustrating the flow of the print speed control corresponding to presence or absence of the display of the first preview image i1.

In the multifunction peripheral 100 of this embodiment, it is possible to set by the operation panel 3 whether to execute the printing at the first print speed of high speed (normal print mode) or at the second print speed of low speed (low noise print mode). Note that when the setting of the print speed is not made specifically, the printing is performed at the first print speed.

Further, the following description is related to a case where the printing is performed at the first print speed (in a case where the printing at the first print speed is set, or in a case where the setting of the print speed is not made specifically). Note that when the setting of printing at the second print speed is made, the setting is prioritized so that the printing at the second print speed is continued.

Therefore, the flow of FIG. 7 is started when the execution instruction is issued (when the start key 35 is pressed) so that the copy job is started basically at the first print speed.

The main controller 6 communicates with the panel controller 30 and checks whether or not the first preview image i1 is displayed before the execution instruction of the copy job to be executed is issued (Step #1). When the first preview image i1 is displayed (Yes in Step #1), the main controller 6 notifies the engine controller 20 and the document reader 1 (the document feed controller 10*b* and the read controller 10*a*) that the first preview image i1 is displayed for the copy job. When receiving this notification, the document reader 1 performs reading at the first read speed, and the engine controller 20 controls the printing portion 2 to print at the first print speed (normal print mode) until the copy job is completed (Step #2 to END).

On the other hand, when the first preview image i1 is not displayed (No in Step #1), the main controller 6 notifies the engine controller 20 and the document reader 1 (the document feed controller 10*b* and the read controller 10*a*) that the first preview image i1 is not displayed for the copy job. Then, the engine controller 20 controls the printing portion 2 to start and execute printing at the second print speed (low noise print mode) (Step #3). Note that during this period, the document reader 1 may execute reading at the first read speed or may execute reading at the second read speed.

Then, the engine controller 20 checks whether or not the printing is executed at the second print speed for a predetermined number of printed sheets from the first sheet (Step #4). In other words, the engine controller 20 checks whether or not the number of sheets printed from the first sheet of the job reaches the predetermined number of printed sheets (Step #4). Here, the predetermined number of printed sheets has an arbitrary value. The predetermined number of printed sheets is set to a value such that a time necessary for printing the predetermined number of printed sheets is a time in which the user who doesn't see the first preview image i1 can notice that there is an omission of setting or a mis-setting in the copy job. Therefore, the predetermined number of printed sheets may be one to a few sheets.

When the printing of the predetermined number of printed sheets at the second print speed is not completed (No in Step #4), the flow returns to Step #3. On the other hand, when the printing of the predetermined number of printed sheets is completed (Yes in Step #4), the engine controller 20 changes the print speed to the first print speed (Step #5). In other words, engine controller 20 controls the printing portion 2 to print from the sheet after the predetermined number of printed sheets from the first sheet of the job to the last sheet at the first print speed (Step #5 to END).

In this way, when the copy job is performed, the printing is performed at the low speed from the first sheet to predetermined number of printed sheets (one to a few sheets). Therefore, it is possible to stop the job having an omission of setting or a mis-setting in a time in which a few sheets are printed from beginning. In other words, in a time in which a few sheets are printed from beginning of the copy job, the user can notice that the copy job is being performed with content different from the user's intention and can stop the copy job. Therefore, even if a copy job with a mis-setting or an omission of setting is executed, there is less waste of paper sheets P, power, and time than in the case where the job is performed only at the first print speed. In addition, when the first preview image i1 is displayed and the content of the job is confirmed, the job is executed at the high speed. In addition, even if the job is executed without confirmation of the content, when the user who checks a part of a job execution result can assume there is no problem, the job execution speed is automatically changed to the high speed (changed to the first print speed). In this way, the image forming apparatus (multifunction peripheral 100) can have high productivity (high speed print performance).

In addition, the engine controller 20 may control the paper sheet feeder 4*a* to stop paper feed after controlling the paper sheet feeder 4*a* to perform paper feed of the number of sheets for printing at the second print speed (low noise print mode), until the last paper sheet P to be printed at the second print speed is discharged to a discharge tray 44. After the discharge, the engine controller 20 controls the printing portion 2 to print a remaining number of sheets of the copy job at the first print speed. In other words, as preparation for changing the print speed, the engine controller 20 may temporarily stop the paper feed from the paper sheet feeder 4*a*, and when all sheets after paper feed at the second print speed, paper sheet transportation, and toner image formation are discharged to the discharge tray 44, the engine controller 20 may control the printing portion 2 to start a print operation such as the paper feed at the first print speed (normal print mode), the paper sheet transportation, and the toner image formation.

Note that the multifunction peripheral 100 of this embodiment includes a discharge detection sensor 25 disposed in a vicinity of a discharge roller pair 46 for detecting that a printed paper sheet P is discharged to the discharge tray 44 (see FIG. 5). The engine controller 20 recognizes that the printed paper sheet P is discharged to the discharge tray 44 based on an output of the discharge detection sensor 25. Alternatively, the engine controller 20 may recognize that the printed paper sheet P is discharged to the discharge tray 44 based on time after start of the paper feed, because a paper sheet transport speed at each print speed is fixed, and hence a transportation distance or time necessary from the paper sheet feeder 4*a* to the discharge is fixed.

(Test Print)

Figure 8:
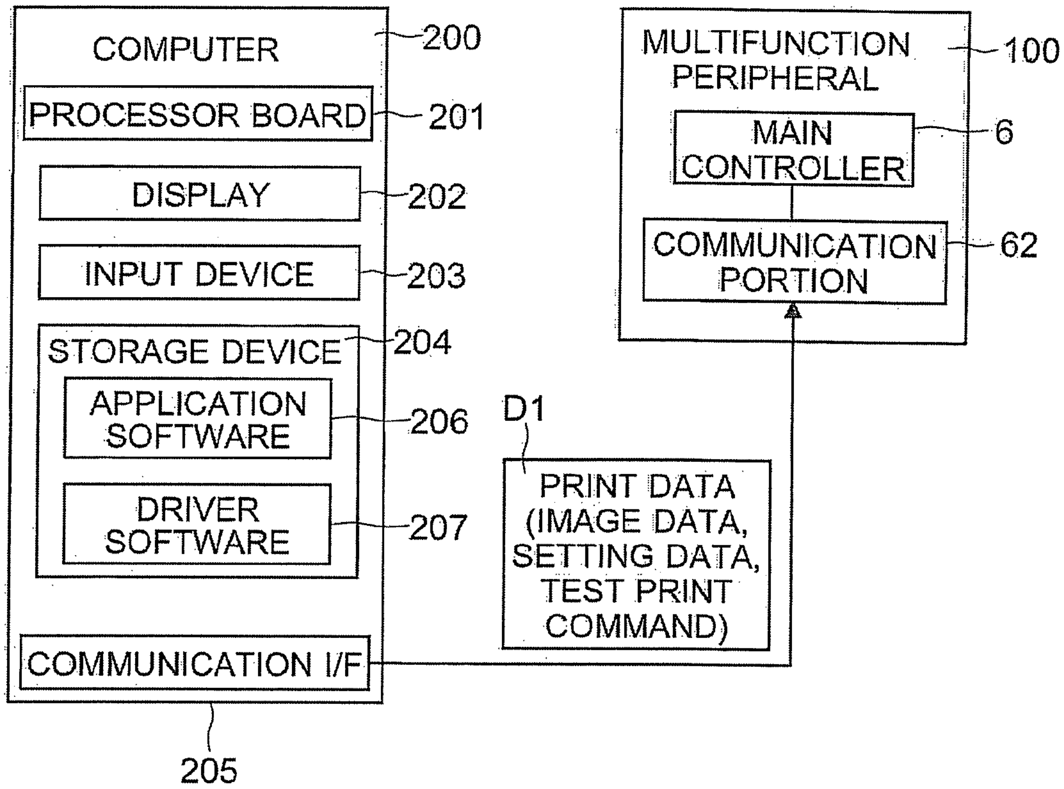
FIG. 8 is an explanatory diagram of a test print according to the embodiment.
Figure 9:
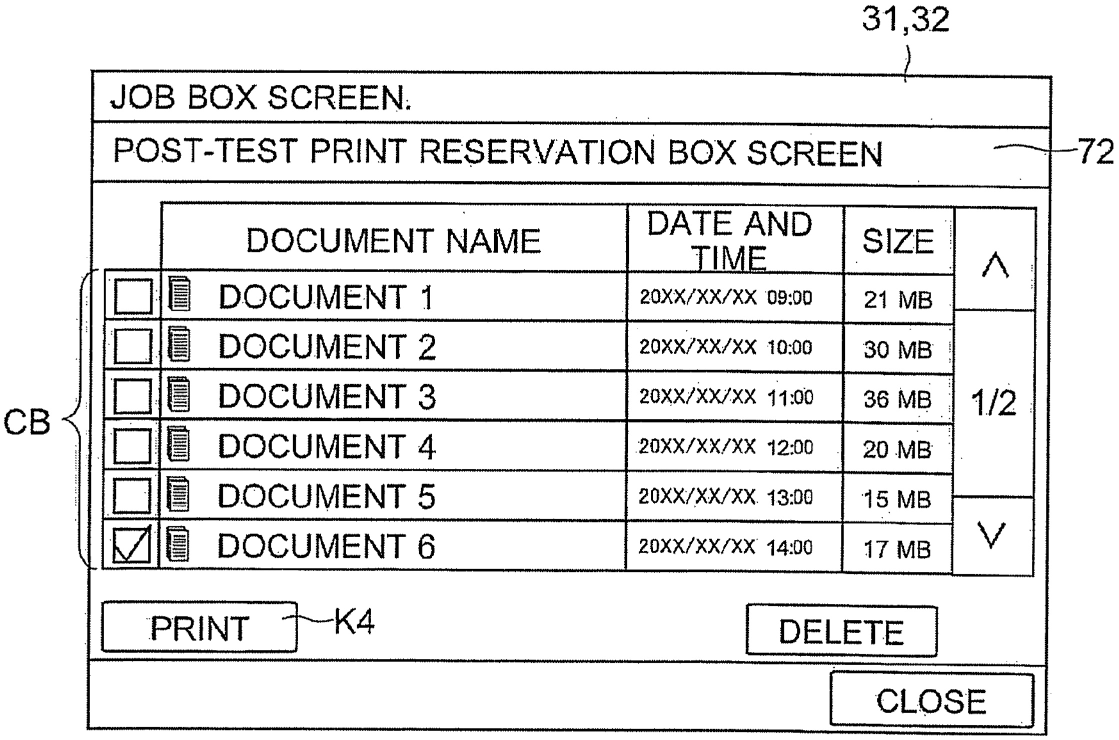
FIG. 9 is a diagram illustrating an example of a reservation box screen after the test print according to the embodiment.

Next, with reference to FIG. 8 and FIG. 9, a test print in the multifunction peripheral 100 of this embodiment is described. FIG. 8 is a diagram for explaining the test print. FIG. 9 is a diagram illustrating a post-test print reservation box screen 72 after the test print.

First, as illustrated in FIG. 8, the multifunction peripheral 100 can be connected to the computer 200 in a communicable manner via a network or a cable.

Here, the computer 200 is described. The computer 200 is a personal computer, a server, or the like. The computer 200 includes a processor board 201 with a CPU and the like for processing and calculation, a display 202 for displaying screens and images, input devices 203 such as a keyboard and a mouse, a storage device 204 including an HDD, a ROM, a RAM, and the like, and a communication I/F 205 for communicating with outside.

Further, the communication I/F 205 of the computer 200 and the communication portion 62 of the multifunction peripheral 100 are connected in a communicable manner via a network or a cable. In this way, it is possible to transmit print data D1 from the computer 200 so that the multifunction peripheral 100 can print based on the print data D1 (the multifunction peripheral 100 is used as a printer).

In addition, various applications 206 (for making a document and for editing images, for example) are installed (stored) in the storage device 204 of the computer 200. In addition, in order to enable the computer 200 to transmit the print data D1 so as to print by the multifunction peripheral 100, driver software 207 for the multifunction peripheral 100 is installed (stored) in the storage device 204.

When the application 206 issues a print command, the driver software 207 is activated. In the driver software 207, various settings can be performed about print content. For instance, in the driver software 207, it is possible to set pages to be printed, a paper sheet P to be used for printing, a zoom magnification, a print density specification, test print setting, a total number of copies to be printed for the test print, and the like. Note that description of details of items that can be set in the driver software 207 is omitted unless otherwise described.

On the basis of the driver software 207, the processor board 201 processes data on the application 206 so as to generate data indicating print content (for example, image data) and setting data indicating setting content set on the driver software 207 as the print data D1. When the setting for performing the test print and the setting of the total number of copies for printing in the test print job are performed on the driver software 207, the processor board 201 generates the print data D1 including data instructing to perform the test print (test print command) and data indicating the total number of copies for printing.

Then, the communication VF 205 transmits the generated print data D1 to the communication portion 62. The communication portion 62 receives the print data D1 transmitted from the computer 200. Then, the main controller 6 recognizes content of the print data D1. In addition, the main controller 6 issues an instruction to the engine controller 20 to control the printing portion 2 to execute printing (print job) based on the print data D1.

When receiving the print job with setting of the test print (print data D1 including the test print command), the main controller 6 issues an instruction to the engine controller 20 to print only one copy based on the print data D1. The engine controller 20 prints every pages one by one page based on the print data D1 including the test print command (print of one copy).

In addition, the main controller 6 controls the storage portion 61 (the HDD included in the storage portion 61) to store and register the print data D1 with the test print in a volatile manner. Then, the user can operate the operation panel 3 so as to print the remaining number of copies of the print data D1 with the test print setting registered in the storage portion 61. In this way, the multifunction peripheral 100 has a function of printing only one copy and reserving printing of remaining number of copies when printing a plurality of copies. Because only one copy is printed, the user can check whether or not there is an omission of setting or a mis-setting by checking the print job after the test print.

Next, with reference to FIG. 9, there is described printing of the remaining number of copies of the print data D1 registered in the storage portion 61. When printing after the test print based on the print data D1 with the test print setting registered in the storage portion 61, the user presses the document box key 33*c* of the operation panel 3.

Then, when a predetermined operation is performed, the display portion 31 displays the post-test print reservation box screen 72. As illustrated in FIG. 9, the registered print data D1 with the test print setting is displayed in the post-test print reservation box screen 72.

In addition, as illustrated in FIG. 9, a check box CB is disposed in accordance with each print data D1 at the left end of the post-test print reservation box screen 72. The panel controller 30 accepts a touch operation of the display position of the check box CB as an operation to instruct (select) the print data D1 for printing the remaining copies. As illustrated in FIG. 9, the display portion 31 displays a check in the check box CB corresponding to the specified print data D1.

In addition, as illustrated in FIG. 9, a print key K4 is disposed in the post-test print reservation box screen 72. When the display position of the print key K4 is touched, the main controller 6 instructs the engine controller 20 to execute printing based on the print data D1 whose check box CB is checked. The engine controller 20 controls the printing portion 2 to execute printing of the remaining number of copies of the specified print data D1 based on the instruction.

(Print Speed Control in Test Print)

Figure 10:
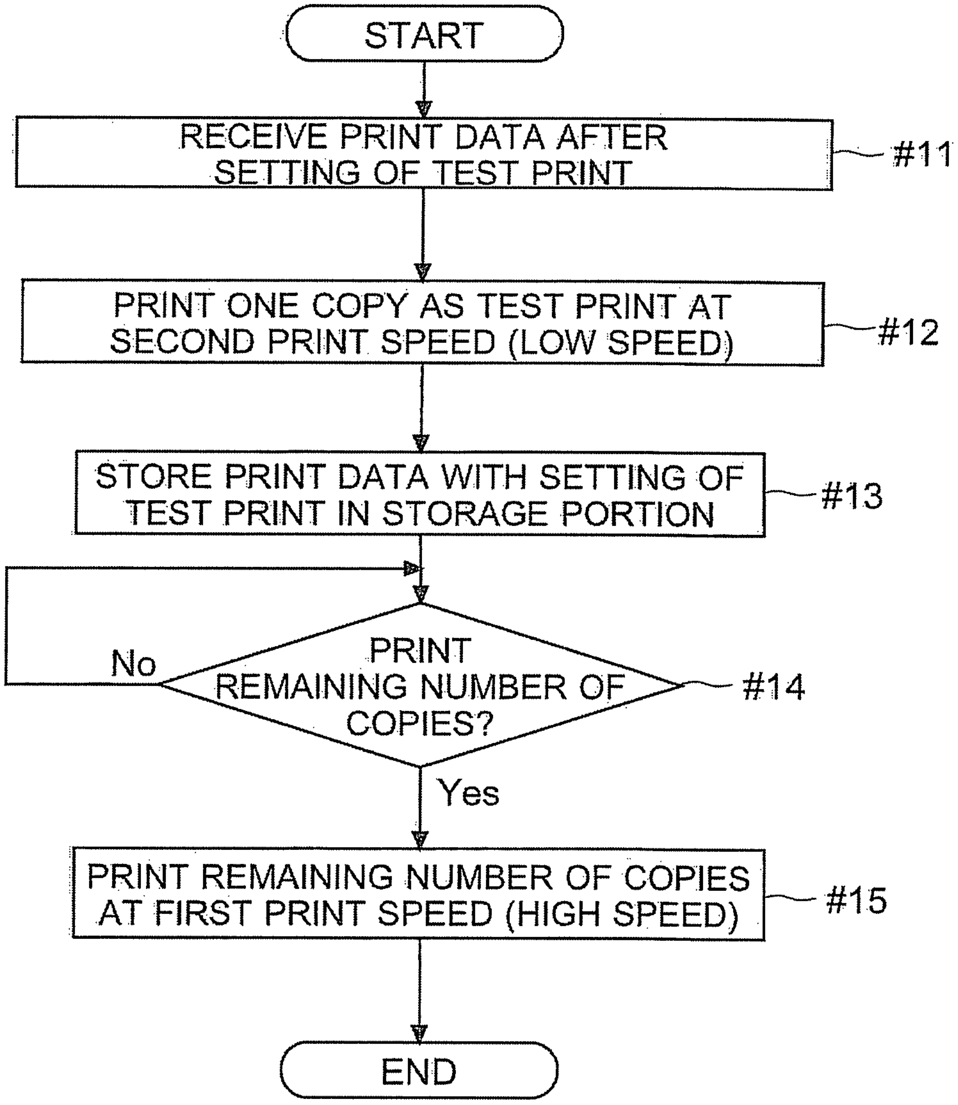
FIG. 10 is a flowchart illustrating an example of a flow of print speed control in the test print according to the embodiment.

Next, with reference to FIG. 10, a flow of print speed control in the test print is described. FIG. 10 is a flowchart illustrating the flow of the print speed control in the test print.

First, the flow of FIG. 10 starts when the computer 200 transmits the print data D1 with test print setting. Note that when there is no test print setting (when the print data D1 does not include the test print command), all the number of copies set in the driver software 207 are printed.

The communication portion 62 receives the print data D1 with the test print setting (Step #11). Then, the main controller 6 issues an instruction to the engine controller 20 to print one copy based on the received print data D1 In response to this, the engine controller 20 controls the printing portion 2 to perform the test print of one copy at the second print speed (low noise print mode based on the received print data D1 (Step #12).

In addition, the main controller 6 controls the storage portion 61 to store (register) the received print data D1 with the test print setting (Step #13). In this way, it is possible to print the remaining number of copies afterward by retrieving the print data D1.

Then, the panel controller 30 continues to check whether or not an operation for printing the remaining number of copies of the print data D1 registered in the storage portion 61 is performed in the post-test print reservation box screen 72 (whether or not there is a print execution instruction for the remaining number of copies) (Step #14, No in Step #14 to Step #14).

When the print execution instruction for the remaining number of copies is issued by the operation panel 3, the engine controller 20 controls the printing portion 2 to print the remaining number of copies at the first print speed (normal print mode) based on the print data D1 (Step #15 to END).

When setting to print at the second print speed is made together with specifying the print data D1 (print job) for printing the remaining number of copies, the engine controller 20 may control the printing portion 2 to print at the second print speed in Step #15 (mode setting by the operation panel is prioritized). When printing at the first print speed is set, or when no specific print speed is set, the printing is performed at the first print speed (normal print mode) in Step #15.

The first copy as the test print is printed at the low speed. Therefore, even if there is a mis-setting or an omission of setting, the user can notice that the job different from the user's intention is being performed and can stop the job in a time in which a few number of sheets are printed. Therefore, it is possible to reduce waste of paper sheets P, power, and time due to job execution with an omission of setting or a mis-setting. In addition, in the second and subsequent copies after the test print, the print job is executed at the high speed. Therefore, when there is no problem in the test print, the job execution speed is automatically changed to the high speed (first print speed). In this way, the image forming apparatus (multifunction peripheral 100) can also have high productivity (high speed job execution performance).

In addition, the storage portion 61 registers the print data D1 with the test print setting, the operation portion (operation panel 3) accepts a reserved data print instruction as an instruction to print the print data D1 registered in the storage portion 61, and the printing portion 2 prints the first copy at the second print speed based on the received print data D1 when the communication portion 62 receives the print data D1 with the test print setting. When the operation portion accepts the reserved data print instruction, the printing portion 2 prints the second and subsequent copies at the first print speed based on the print data D1 corresponding to the reserved data print instruction. In this way, the printing based on the print data D1 is temporarily stopped at the first copy. Therefore, waste printing can be stopped before one copy among the plurality of copies. Therefore, it is possible to reduce waste of paper sheets P, power, and time due to job execution with an omission of setting or a mis-setting.

(Display of Preview Image when Performing Transmission Job)

Figure 11:
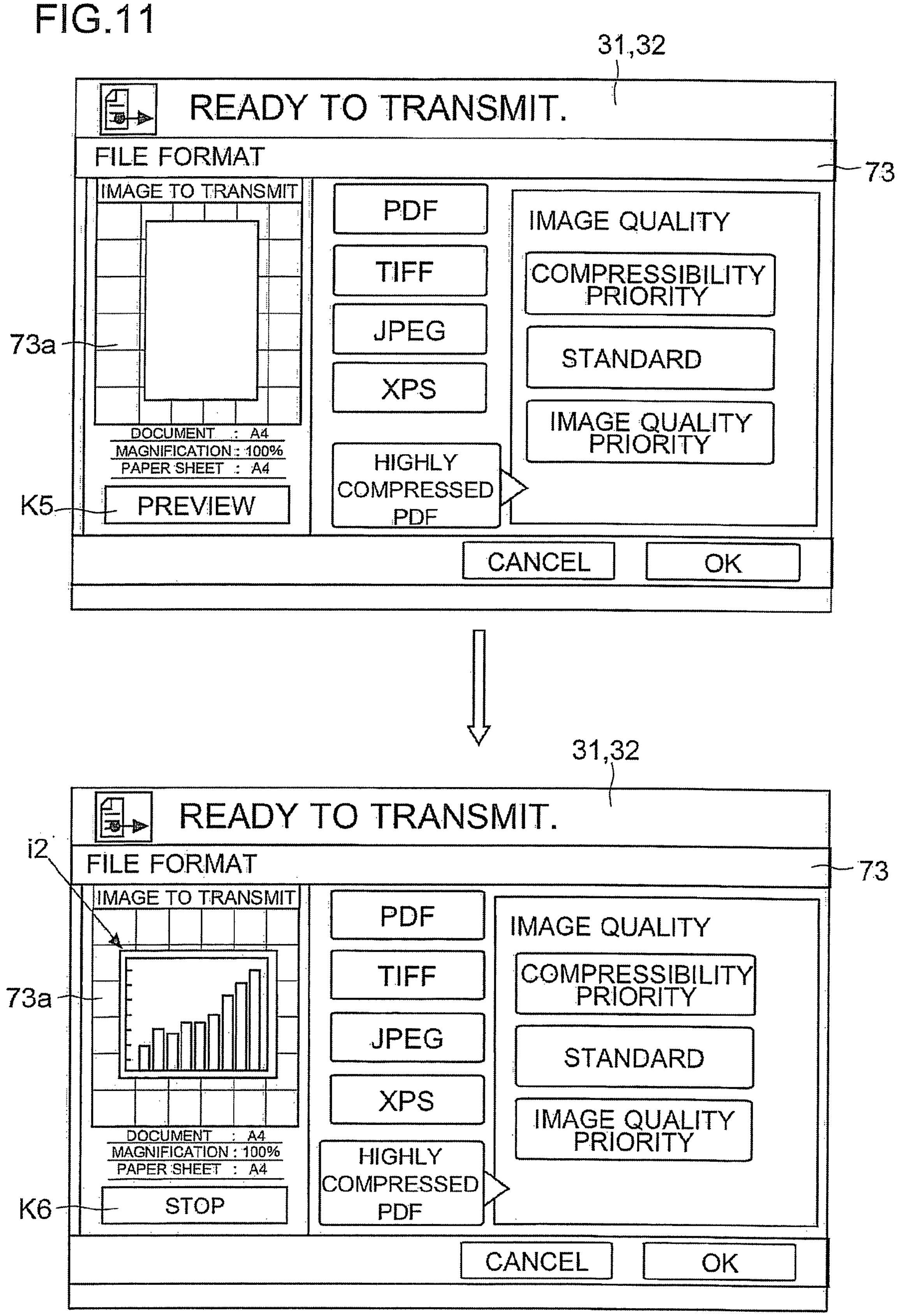
FIG. 11 is an explanatory diagram of an example of a display of a preview image in a transmission job according to the embodiment.
Figure 12:
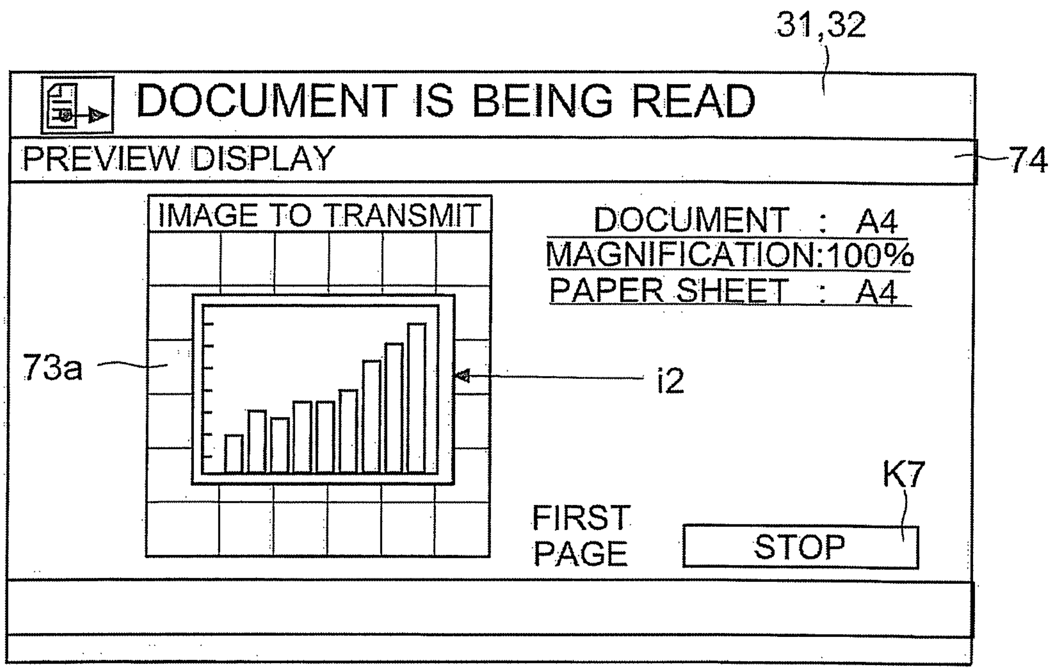
FIG. 12 is an explanatory diagram of an example of a display of a preview image when a document is read by starting the transmission job according to the embodiment.

Next, with reference to FIG. 11, there is described a display of a preview image when performing the transmission job according to the multifunction peripheral 100 of this embodiment. FIG. 11 is a diagram for explaining the display of the preview image when performing the transmission job. FIG. 12 is a diagram for explaining a display of the preview image when the document sheet D is read after starting the transmission job.

First, the multifunction peripheral 100 of this embodiment has a transmission function of performing transmission to the computer 200, the FAX device 300, and the storage portion 61 based on the image data obtained by reading the document sheet D set on the document tray 11 (transmission job function). In order to execute the transmission job, the user first presses the transmission key 33*b* disposed in the operation panel 3. When the panel controller 30 recognizes that the transmission key 33*b* is pressed, the panel controller 30 controls the display portion 31 to display a setting screen for the transmission function.

Then, the panel controller 30 accepts an input of destination information (address, FAX number, and the like) on the other end of the transmission in the setting screen for the transmission function. In addition, the panel controller 30 accepts an input of selecting a setting item about the transmission function in the setting screen for the transmission function. When the user selects a setting item, the panel controller 30 controls the display portion 31 to display a setting screen of the setting item.

The transmission function has many setting items. For instance, there are setting items such as file format setting of the transmission image data, transmission size selection, document size selection, enlargement/reduction setting, density setting, color selection (color or monochrome setting) of the transmission image data, and the like. Because the transmission function has many setting items (functions) and set values that can be selected, description of details of each setting item is omitted unless otherwise described.

FIG. 11 illuminates a setting screen 73 for the setting item of a file format of image data to be transmitted. In this way, the setting screen is prepared for each setting item. The setting screen for the setting item includes the set value key for determining a set value, and the like. The operation panel 3 (panel controller 30) accepts setting about the transmission job such as setting of a transmission destination and setting of set values for setting items about transmission.

The main controller 6 performs communication with the operation panel 3 so as to recognize the content of setting by the operation panel 3. Then, the main controller 6 controls the document reader 1 to perform document reading based on the user's setting content, controls the image processor 64 to generate image data corresponding to the setting, and controls the communication portion 62 to transmit the image data to the set destination.

Further, on the basis of the read document sheet D, a finished image of the image data transmitted by the transmission job (second preview image i2) can be displayed on the display portion 31. In this way, it is possible to check content of the transmitted image data before the transmission.

As illustrated in FIG. 11, a setting screen of each setting item includes a second preview image display area 73*a* for displaying the second preview image i2. Further, as illustrated in the upper part of FIG. 11, a preview key K5 is displayed in the second preview image display area 73*a* before the second preview image i2 is displayed. The preview key K5 is used for instructing to display the second preview image i2.

A flow of display of the second preview image i2 is described. Before the transmission job execution is started, the panel controller 30 recognizes (accepts) a touch operation of the display position of the preview key K5 as an instruction to display the second preview image i2 (a preview display instruction or a content confirmation input).

When being informed by the panel controller 30 that the preview display instruction is issued, the main controller 6 controls the document reader 1 to read the document sheets D. In reading of the plurality of document sheets D set on the document tray 11, the document reader 1 reads a few document sheet D from the first sheet for the transmission job.

The image data generated by reading the document sheets D is stored in the storage portion 61. Further, the image data output from the document reader 1 has too many pixels to display on the display portion 31. Therefore, the image processor 64 generates preview image data for displaying the second preview image i2 on the display portion 31. In this case, the image processor 64 generates the preview image data on which the setting by the operation panel 3 is reflected. Then, as illustrated in the lower part of FIG. 11, the panel controller 30 controls to display the second preview image i2 in the second preview image display area 73*a* based on the preview image data.

When there is no problem in the content of the second preview image i2 (the content is what the user intends), the user presses the start key 35. When the start key 35 is pressed, the main controller 6 controls the document reader 1 to continue reading of the document sheet D (controls the document reader 1 to perform the transmission job).

When the content of the second preview image i2 is not what the user intends, the user touches the display position of a stop key K6 disposed in the second preview image display area 73*a* (see the lower part of FIG. 11). The stop key K6 is displayed to replace the preview key K5 when the second preview image i2 is displayed. In addition, it is possible to press the stop key 35*a* disposed as a hardware key in the operation panel 3 (see FIG. 3). The panel controller 30 accepts these operations as a preview end instruction.

When the preview end instruction is issued, the panel controller 30 controls the display portion 31 to display a setting screen of the transmission job. Then, the user sets a setting item to be set. Further, after changing the setting, when the display position of the preview key K5 is touched, the panel controller 30 controls the display portion 31 to display the second preview image i2 corresponding to the setting content after the change.

In addition, when the start key 35 is pressed so that the transmission job is started (when reading of the document sheet D is started), the panel controller 30 controls the display portion 31 to automatically display a preview display screen 74 for displaying the finished image of each page (second preview image i2) of the image data transmitted in the transmission job based on the read document sheet D (see FIG. 12). The panel controller 30 controls to switch the display of the second preview image i2 in page order in the preview display screen 74 as the reading of the document sheet D proceeds. In this case, too, the image processor 64 generates the preview image data in page order on which the setting by the operation panel 3 is reflected. Then, the generated preview image data is transmitted to the panel controller 30. On the basis of the preview image data of pages received sequentially, the panel controller 30 controls the display portion 31 to display the second preview image i2 like a slide show. In this way, it is possible to check the content of the generated and transmitted image data. In this case, the panel controller 30 controls the display portion 31 to display a stop key K7. When the display position of the stop key K7 is touched, the main controller 6 controls the document reader 1 to stop the transmission job.

(Read Speed Control Corresponding to Presence or Absence of Display of Second Preview Image i2 Before Starting Transmission Job)

Figure 13:
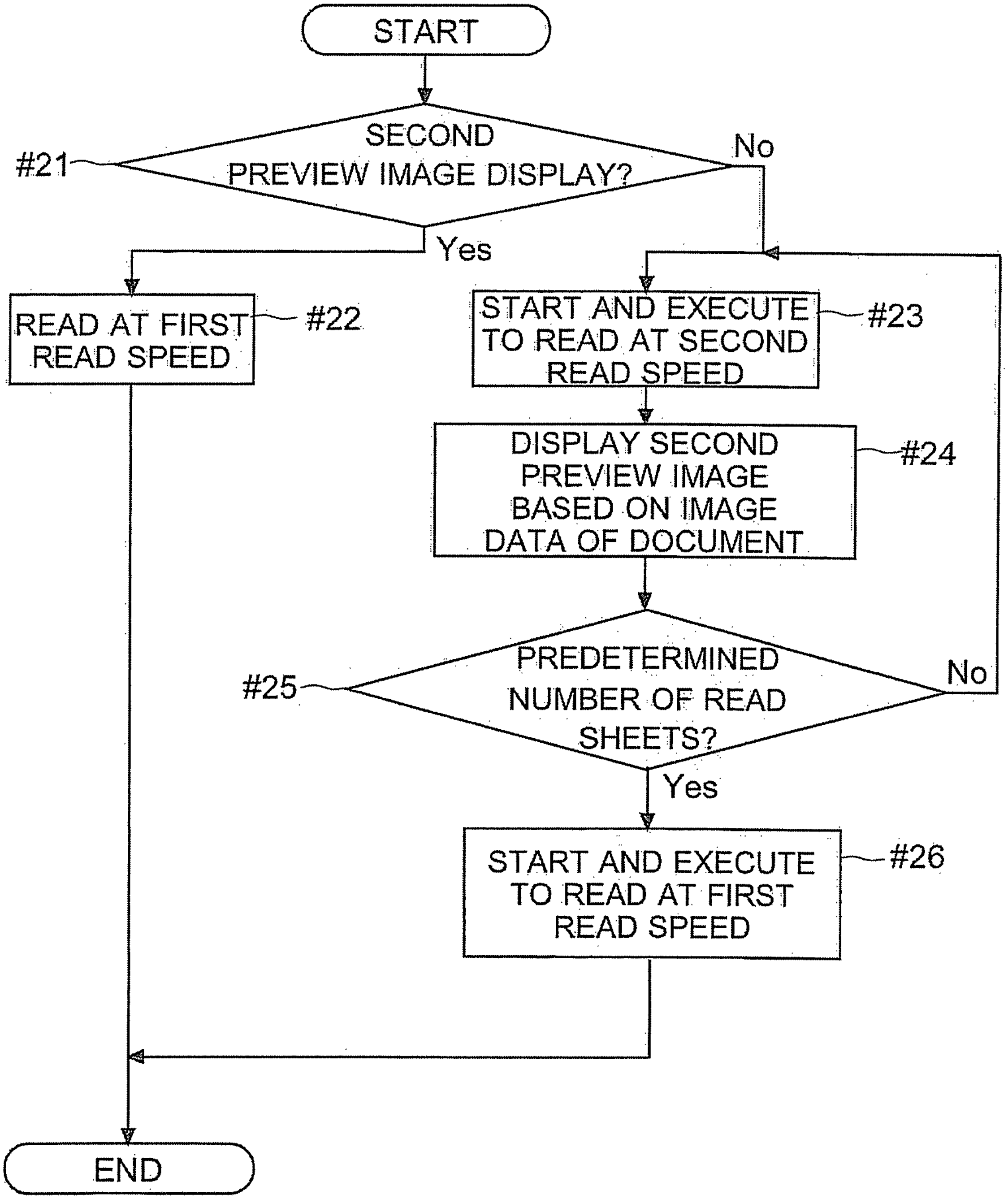
FIG. 13 is a flowchart illustrating an example of a flow of read speed control in accordance with presence or absence of a display of a second preview image according to the embodiment.

Next, with reference to FIG. 13, there is described a flow of read speed control corresponding to whether or not the second preview image i2 is displayed before starting the transmission job. FIG. 13 is a flowchart illustrating a flow of the read speed control corresponding to presence or absence of a display of the second preview image i2. Note that the control of changing the reading speed of the document sheet D is applied to a case where the plurality of documents sheets D set on the document tray 11 are successively read.

In the multifunction peripheral 100 of this embodiment, it is possible to set by the operation panel 3 whether or not to read at the first read speed (normal reading mode) of the high speed or at the second read speed (low-noise reading mode) of the low speed in the transmission job (scan job). Note that when the setting of the read speed is not made specifically, the reading is performed at the first print speed.

Further, the following description is related to a case where the reading is performed at the first read speed (in a case where the reading at the first read speed is set, or in a case where the setting of the read speed is not made specifically). Note that when the setting of reading at the second read speed is made, the reading is performed at the second read speed.

Therefore, the flow of FIG. 13 is started when the transmission job execution instruction is issued so that the transmission job is started without setting of the reading at the second read speed.

The main controller 6 communicates with the panel controller 30 and checks whether or not the second preview image i2 is displayed before the execution instruction of the transmission job to be executed (after the start of setting until the start key 35 is pressed) (Step #21).

When the second preview image i2 is displayed before the transmission job is started (Yes in Step #21), the main controller 6 notifies the document reader 1 (the document feed controller 10*b* and the read controller 10*a*) that the document sheets D is read for the transmission job whose second preview image i2 is displayed. When receiving this notification, the document reader 1 reads all the document sheets D at the first read speed (normal reading mode) (Step #22 to END). When the second preview image i2 is checked before the transmission job, the finished state is checked, and it can be assumed that there is a low possibility of an omission of setting or a mis-setting. Therefore, the reading is performed at the high speed from the beginning (from first page).

On the other hand, when the second preview image i2 is not displayed before the transmission job is started (No in Step #21), the main controller 6 notifies the document reader 1 (the document feed controller 10*b* and the read controller 10*a*) that the second preview image i2 is not displayed for the transmission job. Then, the document reader 1 first reads the document sheets D at the second read speed (low-noise reading mode) (Step #23).

In addition, the main controller 6 and the panel controller 30 controls to display the second preview image i2 in the preview display screen 74 based on the image data of the document sheets D read at the second read speed (Step #24). In this case, as the reading of the document proceeds, the second preview image i2 is switched to the next page in order in the preview display screen 74. Note that even if the second preview image i2 is displayed before the transmission job is started, the main controller 6 and the panel controller 30 control the display portion 31 to display the second preview image i2 based on the image data of the document sheet D read at the first read speed.

Then, the document feed controller 10*b* and the read controller 10*a* checks whether or not the document sheets D are read at the second read speed for a predetermined number of read sheets from first page (Step #25). In other words, the main controller 6 and the document feed controller 10*b* checks whether or not the number of read sheets from first page has reached the predetermined number of read sheets (Step #25). Here, the predetermined number of read sheets has an arbitrary value. The predetermined number of read sheets is set to a value such that a time necessary for reading the predetermined number of read sheets is a time in which the user can notice that there is an omission of setting or a mis-setting in the transmission job when the user see the second preview image i2 displayed in the display portion 31 after the reading of document is started. Therefore, the predetermined number of read sheets may be one to a few sheets.

When the reading of the predetermined number of read sheets at the second read speed is not completed (No in Step #25), the flow returns to Step #23. On the other hand, when the reading of the predetermined number of read sheets at the second read speed is completed (Yes in Step #25), the document feed controller 10*b* and the read controller 10*a* changes the read speed to the first read speed. Then, the document reader 1 performs the reading at the first read speed from a page after the predetermined number of read sheets until the last page (Step #26 to END).

Here, when the reading at the second read speed is not set so that the second preview image i2 is not displayed before the transmission job is started (when the content confirmation input by the preview key K5 is not made), the document reader 1 starts the reading at the second read speed. Then, the document reader 1 changes the read speed to the first read speed in the middle. In this way, in the multifunction peripheral 100 of this embodiment, the read speed is changed in the middle of the transmission job.

Therefore, the document feed controller 10*b* may stop the paper feed of the document sheets D until the last document sheet D to be read at the second read speed is discharged to the document discharge tray 13 after the paper feed from the document tray 11 for sheets to be read at the second read speed. After that, the document reader 1 reads the remaining pages of the document sheets D for the transmission job at the first read speed. In other words, as preparation for changing the read speed, the document feed controller 10*b* temporarily stop the paper feed from the document tray 11. Then, when all the document sheets D to be read at the second read speed (low-noise reading mode) are discharged to the document discharge tray 13, the document feed controller 10*b* and the read controller 10*a* control individual members of the document reader 12 to start the document reading at the first read speed (normal reading mode).

The feed speed of the document sheets D is fixed, and hence a transportation distance necessary from the paper feed position to the discharge to the document discharge tray 13 is fixed. Therefore, the document feed controller 10*b* and the read controller 10*a* may recognize that the document sheet D is discharged to the document discharge tray 13 based on time after paper feed start of the document sheets D.

In this way, it is possible to reduce the reading speed of the document sheets D on stage from the start of the reading of the document sheets D. Therefore, when the user notices that the image data is being transmitted in content different from the user's intention, the user stops the job in time in which the number of read sheets of the document sheets D is a few. Therefore, it is possible to reduce waste of power and time due to the transmission job execution with a mis-setting or an omission of setting as much as possible. In addition, even if the feeding speed of the document sheet D is low, when the user confirms that there is no problem by checking the second preview image i2, the reading speed of the document sheet D is automatically changed to the high speed (first read speed). In this way, the image forming apparatus (multifunction peripheral 100) can have high productivity (high speed document reading performance).

(Rotation Stop of Polygon Motor 24)

Figure 14:
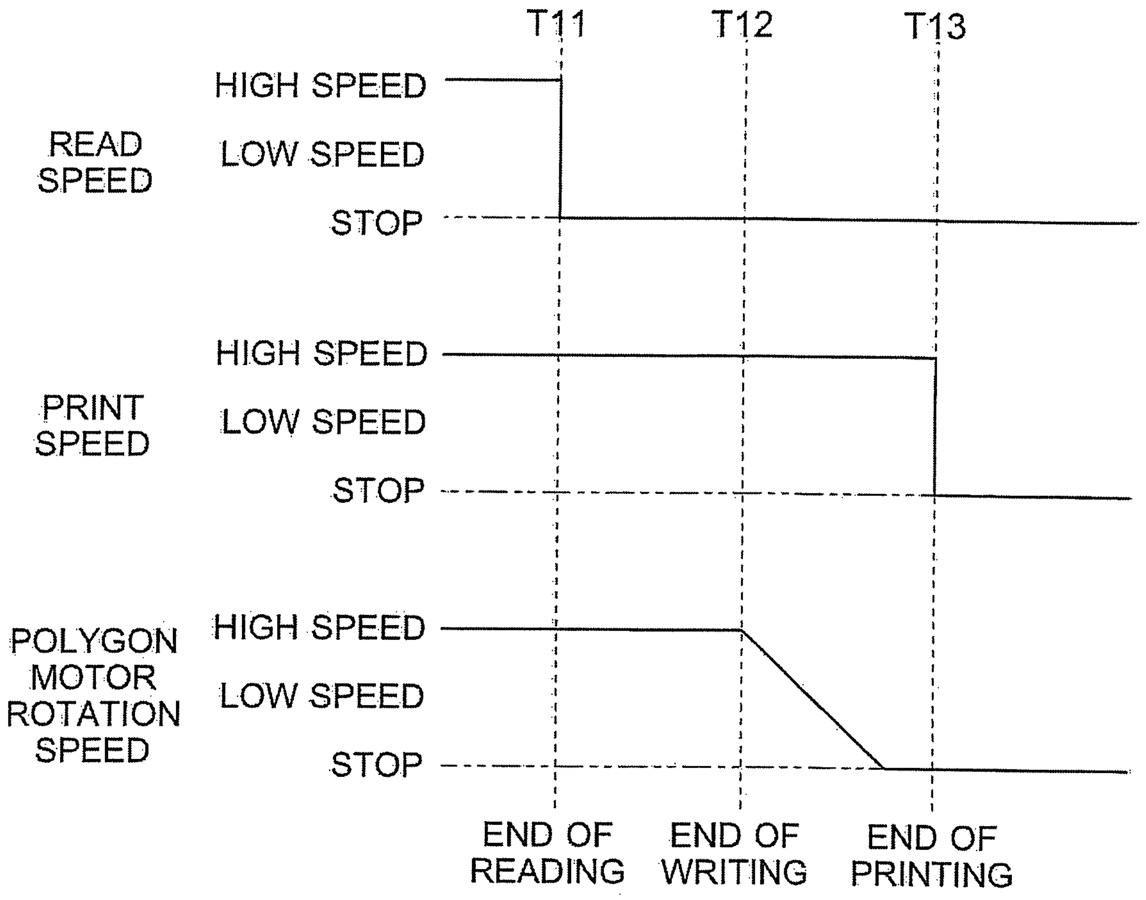
FIG. 14 is a timing chart illustrating an example of rotation stop of a polygon motor according to the embodiment.

Next, with reference to FIG. 5 and FIG. 14, there is described rotation stop of the polygon motor 24 according to this embodiment. FIG. 14 is a timing chart for explaining rotation stop of the polygon motor 24.

The exposing device 51 includes a semiconductor laser device (not shown) and the polygon motor 24 for rotating the polygon mirror 24*a* for reflecting the laser beam from the semiconductor laser device for scanning and exposing the photoreceptor drum (see FIG. 4). A rotation speed of the polygon motor 24 is high speed up to a few tens thousands rpm. Therefore, when the polygon motor 24 is rotated, high frequency noise is generated. The polygon motor 24 can be a source of noise grating and loud for the user. There is a case where the high frequency noise grating for the user is generated.

Conventionally, the engine controller 20 continues to receive a drive signal for rotating the polygon motor 24 (rotation of the polygon motor 24 is continued) until the last paper sheet P of the print job is discharged to the discharge tray 44.

Therefore, conventionally, the noise the user may feel uncomfortable is generated after the start of printing until the last paper sheet P of the print job is discharged to the discharge tray 44, and in the period while the polygon motor 24 is continues to rotate due to inertia after the discharge to the discharge tray 44.

Therefore, in the multifunction peripheral 100 of this embodiment, when the engine controller 20 finishes scanning and exposing (writing on the photoreceptor drum) for the last page of the print job, the engine controller 20 stops rotation of the polygon motor 24. In other words, the engine controller 20 stops input of a drive signal to the polygon motor 24 before the paper sheet of the last page is discharged to the discharge tray 44. The multifunction peripheral 100 of this embodiment may execute a job at the second print speed and at the second read speed and has low-noise performance. By stopping the rotation of the polygon motor 24 in early stage, the low-noise performance is enhanced.

This point is described with reference to FIG. 14. In FIG. 14, time point T11 is a time point when the reading (document transportation and image data generation) of the document sheets D by the document reader 1 is finished. In the copy job, reading of the last page among the document sheets D to be copied (the last page of the document sheets D set on the document tray 11) is finished before printing of the last page is started. Note that the document feed controller 10*b* can recognize whether or not the fed document sheet D is the last page based on the output of the document detection sensor 10*s*.

Then, in the printing of the last page, scanning and exposing of the photoreceptor drum necessary for forming the toner image of the last page is finished before paper sheet transportation, fixing, primary transfer, secondary transfer until the discharging to the discharge tray 44. In FIG. 14, T12 is a time point of finishing the scanning and exposing of the photoreceptor drum necessary for forming the toner image of the last page.

Note that it is possible to arbitrarily set the time point of finishing the scanning and exposing of the photoreceptor drum for the last page. For instance, it is possible to set a time point when a scanning and exposing position of the photoreceptor drum exceeds a position corresponding to the last line in the sub-scanning direction of the last page in the print job as the time point of finishing the scanning and exposing of the photoreceptor drum for the last page. In addition, the engine controller 20 recognizes a dot position to which toner is applied on the rearmost end of the paper sheet in the sub-scanning direction in the last page based on the image data of the last page for the print job, and may regard a time point when all the dots to be exposed in the last page are scanned and exposed (when the dot on the rearmost end of the paper sheet in the sub-scanning direction to which toner is applied is exposed) as the finishing time point.

Further, T13 in FIG. 14 indicates a time point when the paper sheet P is discharged to the discharge tray 44 (printing end time point). In the example illustrated in FIG. 14, before the last page is discharged to the discharge tray 44, the polygon motor 24 is stopped. In this way, the engine controller 20 starts to stop the rotation of the polygon motor 24 so as to quickly reduce noise generated from the polygon motor 24 at the time point of finishing the scanning and exposing of the photoreceptor drum for the last page.

In this way, the low-noise performance is enhanced by starting to stop the rotation of the polygon motor 24 more quickly than the conventional structure, and hence it is possible to reduce noise generated from the image forming apparatus (multifunction peripheral 100).

(Intentional Shift of Paper Feed Timing)

Figure 15:
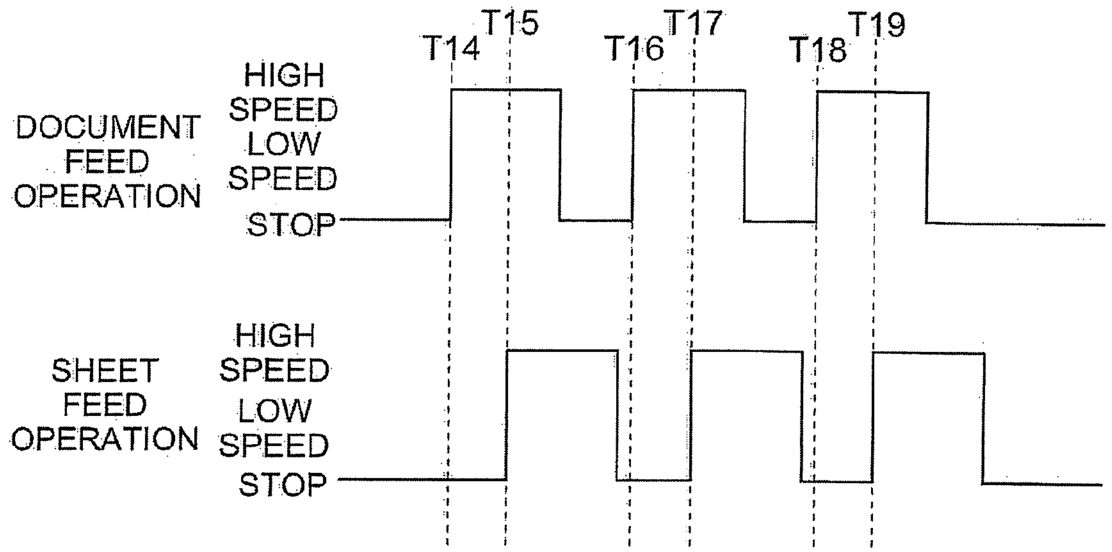
FIG. 15 is a diagram illustrating an example of a time shift between document feed start in the document reader and start of paper sheet feed from the paper sheet feeder according to the embodiment.

Next, with reference to FIG. 15, there is described a shift between the start of feeding the document sheet D in the document reader 1 and the start of feeding the paper sheet P from the paper sheet feeder 4*a*. FIG. 15 is a diagram illustrating the shift between the start of feeding the document sheet D in the document reader 1 and the start of feeding the paper sheet P from the paper sheet feeder 4*a*.

In feeding the document sheets D from the document tray 11, a large noise is apt to be generated when starting to feed the set document sheet D. In addition, in printing, a large noise is apt to be generated when starting to feed the paper sheet P in the cassette (in the paper sheet feeder 4*a*).

Here, when the printing is performed while reading the document sheets D in the copy job, the time point of starting to feed the document sheet D may be the same as or close to the time point of starting to feed the paper sheet P. When the time point of starting to feed the document is close to the time point of starting to feed the paper sheet, time slots in which large noises are generated are overlapped so that the total noise level becomes substantially high.

Therefore, in the multifunction peripheral 100 of this embodiment, in order to reduce noise generated from the multifunction peripheral 100, the main controller 6 sets a predetermined interval or longer between the start timing (time point) of feeding the paper sheet from the paper sheet feeder 4*a* and the start timing (time point) of feeding the document sheet from the document feeder 1*b*. In this way, it is possible to prevent increase of noise generated from the multifunction peripheral 100 due to overlapping of feeding the paper sheet P. The multifunction peripheral 100 of this embodiment may execute the job at the second print speed and at the second read speed so as to have low-noise performance. By shifting the paper feed timing, the low-noise performance is enhanced.

This point is described with reference to FIG. 15. In FIG. 15, a High state in the upper chart is a state where the document sheet D is being fed, and is a state where the document feed motor 10*m* is rotated. In addition, a Low state is a state where the document sheet D is not being fed, and is a state where the document feed controller 10*b* does not rotate the document feed motor 10*m*.

In addition, in FIG. 15, a High state in the lower chart is a state where the paper sheet feeder 4*a* is performing the paper feed, and is a state where the sheet feed roller 41 is rotated. In addition, a Low state is a state where the paper sheet feeder 4*a* is not performing the paper feed, and is a state where the sheet feed roller 41 is not rotated.

In the multifunction peripheral 100 of this embodiment, as illustrated in time points T14 to T19, the engine controller 20 and the document feed controller 10*b* set a difference between the feed start time point of the document sheet D and the paper feed start time point (rotation start time point of the sheet feed roller 41). The difference is the predetermined interval or longer.

(Adjustment of Operation Sound Volume)

Figure 16:
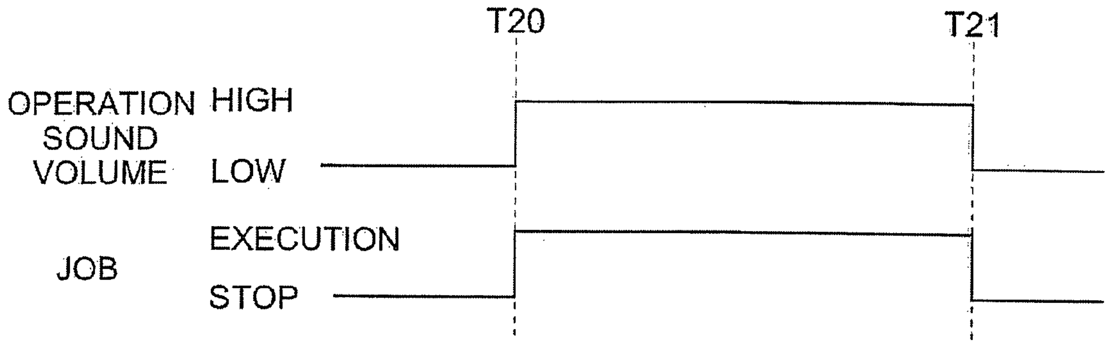
FIG. 16 is a diagram illustrating an example of adjustment of operation sound volume corresponding to printing according to the embodiment.

Next, with reference to FIG. 5 and FIG. 16, there is described volume adjustment of operation sound in the operation panel 3 in accordance with whether or not printing is being executed. FIG. 16 is a diagram for explaining the operation sound volume adjustment in accordance with whether or not printing is being executed.

First, the operation panel 3 includes a sound output portion 38 that generates operation sound in accordance with touch operation of the software key or the hardware key disposed in the operation panel 3 (see FIG. 5). For instance, the sound output portion 38 is a speaker that generates electronic sounds. By the operation sound, the user can recognize that the touch operation is accepted.

When the document sheet D is not being fed and the printing is not performed, the image forming apparatus generates little sound. Therefore, in the state where no job is being executed, the operation sound is apt to sound loud. Further, when the operation sound is high or when the operation sound volume is large, the user may feel unpleasant.

Therefore, in the multifunction peripheral 100 of this embodiment, the sound output portion 38 sets the operation sound to be smaller in a case where the document reader 1 and the printing portion 2 are not executing a job than in a case where the document reader 1 and the printing portion 2 are executing a job. On the other hand, the sound output portion 38 sets the operation sound to be larger in the case where the document reader 1 and the printing portion 2 are executing a job than in the case where the document reader 1 and the printing portion 2 are not executing a job. In this way, large operation sound is generated in the case where a job is being executed so that the operation sound can be heard easily, while the user does not feel unpleasant. The multifunction peripheral 100 of this embodiment may execute a job at the second print speed and at the second read speed so as to have low-noise performance. By adjusting the operation sound, it is possible to provide the multifunction peripheral 100 that does not cause the user to feel unpleasant.

Specifically, description is added with reference to FIG. 16. The upper chart in FIG. 16 indicates a high or low level of the operation sound. In addition, the lower chart indicates presence or absence of job execution such as document reading (document feeding) or printing (paper feeding and discharging). A High state indicates a state where the job is being executed, and a Low state indicates a state where the job is not being executed.

Further, as illustrated in FIG. 16, when the job such as document reading or printing is executed, the panel controller 30 sets the operation sound volume to a large level (time point T20). Then, when an operation is performed during the job execution, the panel controller 30 controls the sound output portion 38 to output a larger operation sound than in the state where the job is not being executed. When the job is completed (when the paper sheet P is discharged to the discharge tray 44 or when reading of the last page of the document sheets D is completed), the panel controller 30 sets the operation sound volume to a small level (time point T21).

(Rotation Control of Fan 26 Corresponding to Print Mode)

Figure 17:
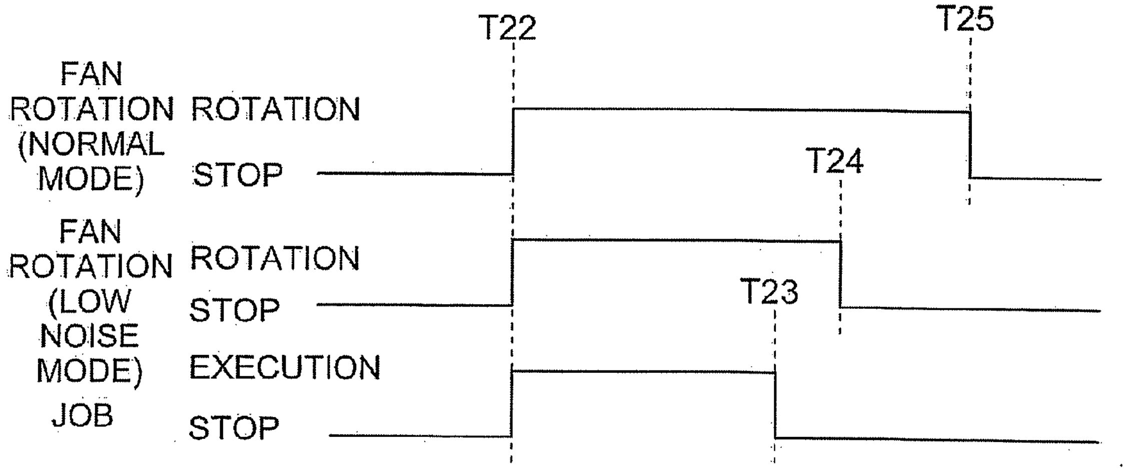
FIG. 17 is an explanatory diagram of an example of fan rotation control according to a print mode according to the embodiment.

Next, with reference to FIG. 5 and FIG. 17, there is described rotation control of the fan 26 in accordance with a print mode. FIG. 17 is a diagram for explaining the rotation control of the fan 26 in accordance with a print mode.

First, the multifunction peripheral 100 of this embodiment includes one or more fans 26 for cooling, heat dissipation, air circulation in the apparatus, and the like (see FIG. 5). The fan 26 performs air suction and blowing. The fan 26 is disposed to face a cover on the rear or the side of the multifunction peripheral 100 or is disposed inside the apparatus.

The engine controller 20 controls rotation (ON/OFF of rotation) of the fan 26. Specifically, the engine controller 20 rotates the fan 26 when the print job is started (paper feeding is started) and stops the rotation of the fan 26 when the printing is finished (when the last page of the paper sheets is discharged) or after a predetermined cooling time elapses from the finish of the printing.

Here, when the fan 26 is rotated, wind noise and motor drive noise are generated. Therefore, the noise generated from the image forming apparatus can be suppressed by inhibiting rotation of the fan 26. Therefore, in the multifunction peripheral 100 of this embodiment, the printing portion 2 has the normal mode in which the printing is executed at the predetermined first print speed and the low noise mode in which the printing is executed at the second print speed lower than the first print speed. The operation portion (operation panel 3) accepts the mode setting whether the printing is executed in the normal mode or in the low noise mode (when the printing is executed without the mode setting, the printing is executed in the normal mode). Then, the engine controller 20 sets a difference between a time point when the fan 26 is stopped in the normal print mode and a time point when the fan 26 is stopped in the low noise print mode.

Specifically, the fan 26 is stopped at an earlier time point in printing in the low noise print mode than in printing in the normal print mode. This point is described with reference to FIG. 17. First, T22 in FIG. 17 is a time point at which the print job is started (start time point of paper feeding of the paper sheets P). In this embodiment, there is described an example where the fan 26 is rotated from start of the print job. However, it is possible to start to rotate the fan 26 when a predetermined time elapses from the start of the printing.

Further, T23 in FIG. 17 indicates a time point when the print job is completed (when the last page is discharged to the discharge tray 44 in the print job). Then, in order to reduce noise generated from the multifunction peripheral 100 as quickly as possible in printing in the low noise print mode, the engine controller 20 stops the fan 26 more quickly than in printing in the normal print mode. In other words, the engine controller 20 sets a period after finishing the print job until stopping the fan 26 in the low noise print mode to be shorter than that in the normal reading mode. In FIG. 17, T24 indicates the time point when the engine controller 20 stops the fan 26 in printing in the low noise print mode, and T25 indicates the time point when the engine controller 20 stops the fan 26 in printing in the normal print mode.

In this way, in the low noise print mode, the fan 26 can be stopped based on the feature of the mode to reduce noise due to the job as much as possible. In addition, it is possible to further reduce noise generated from the image forming apparatus in the low-noise reading mode.

Although embodiments of the present disclosure are described above, the scope of the present disclosure is not limited to this but can be variously modified within the scope without deviating from the spirit of the disclosure.

What is claimed is:

1. An image forming apparatus comprising:

an input portion including an operation portion configured to accept user's setting input and stop of a job under execution, and a communication portion configured to performing data communication with outside, so as to accept a content confirmation input for confirming content of the job to be executed; and a job execution portion operable, for a job for which a content confirmation input has been accepted by the input portion and then an execution instruction has been issued, to execute the job at a predetermined speed with respect to all sheets and, for a job for which no content confirmation input has been accepted by the input portion and then an execution instruction has been issued, to execute the job at a speed lower than the predetermined speed with respect to a predetermined number of sheets starting with a first sheet and at the predetermined speed with respect to remaining sheets wherein:

the job execution portion includes a printing portion configured to feed paper sheets and to print on the paper sheets, and a document reader including a document feeder configured to automatically feed document sheets one by one, so as to read the fed document sheets and to generate image data, the operation portion includes a display portion, accepts a copy job execution instruction to execute printing based on image data of the document sheets read by the document reader and content of setting by the operation portion, and accepts a preview display instruction as the content confirmation input, when the operation portion accepts the preview display instruction, the document reader reads the document sheets, and the display portion displays a first preview image indicating a copy job execution result based on the image data of the document sheets read by the document reader before starting the copy job execution and the content of setting by the operation portion, and when the execution instruction is issued, the printing portion prints all pages at a first print speed for a job for which the first preview image is displayed, while prints a predetermined number of printed sheets from first at a second print speed and prints remaining pages at the first print speed for a job for which the first preview image is not displayed, and the first print speed is faster than the second print speed.

2. The image forming apparatus according to claim 1, wherein the printing portion includes a paper sheet feeder configured to feed paper sheets, and the paper sheet feeder and the document feeder start to feed paper sheets and document sheets at different timings.

3. The image forming apparatus according to claim 1, further comprising a fan being rotated in a print operation, wherein the printing portion has a normal mode in which printing is executed at the predetermined first print speed and a low noise mode in which printing is executed at the second print speed lower than the first print speed, the operation portion accepts mode setting whether to execute printing at the normal mode or at the low noise mode, the printing portion prints at a speed corresponding to the set mode when the mode setting is made, and prints at the normal mode when printing is executed without the mode setting, and the fan stops at an earlier time point in printing in the low noise mode than in printing in the normal mode.

4. The image forming apparatus according to claim 1, wherein the printing portion includes an image forming portion including an exposing device configured to execute scanning and exposing based on the image data so as to form an electrostatic latent image on the photoreceptor drum, so as to form a toner image, the exposing device includes a polygon motor for rotating a polygon mirror, and the polygon motor starts to stop when scanning and exposing necessary for printing a last page is completed.

5. An image forming apparatus comprising:

an input portion including an operation portion configured to accept user's setting input and stop of a job under execution, and a communication portion configured to performing data communication with outside, so as to accept a content confirmation input for confirming content of the job to be executed; and a job execution portion operable, for a job for which a content confirmation input has been accepted by the input portion and then an execution instruction has been issued, to execute the job at a predetermined speed with respect to all sheets and, for a job for which no content confirmation input has been accepted by the input portion and then an execution instruction has been issued, to execute the job at a speed lower than the predetermined speed with respect to a predetermined number of sheets starting with a first sheet and at the predetermined speed with respect to remaining sheets;

wherein:

the job execution portion includes a printing portion configured to feed paper sheets and to print on the paper sheets, the communication portion receives print data transmitted from outside including data indicating print content and setting data for printing, the printing portion prints one copy of first printing at a second print speed and prints second and subsequent copies at a first print speed in a print job based on the received print data, and the first print speed is faster than the second print speed;

wherein the image forming apparatus further comprises a storage portion for storing data, wherein the storage portion registers the print data with test print setting, the operation portion accepts a reserved data print instruction for instructing to print the print data registered in the storage portion, and when the communication portion receives the print data with test print setting, the printing portion prints a first copy at the second print speed based on the received print data, and when the operation portion accepts the reserved data print instruction, the printing portion prints second and subsequent copies at the first print speed based on the print data corresponding to the reserved data print instruction.

6. An image forming apparatus comprising:

an input portion including an operation portion configured to accept user's setting input and stop of a job under execution, and a communication portion configured to performing data communication with outside, so as to accept a content confirmation input for confirming content of the job to be executed; and a job execution portion operable, for a job for which a content confirmation input has been accepted by the input portion and then an execution instruction has been issued, to execute the job at a predetermined speed with respect to all sheets and, for a job for which no content confirmation input has been accepted by the input portion and then an execution instruction has been issued, to execute the job at a speed lower than the predetermined speed with respect to a predetermined number of sheets starting with a first sheet and at the predetermined speed with respect to remaining sheets;

wherein:

the operation portion includes a sound output portion configured to generate operation sound of user's touch operation, and the sound output portion sets the operation sound to be louder in a case where the job execution portion is executing the job than in a case where the job execution portion is not executing the job.

7. An image forming apparatus comprising:

an input portion including an operation portion configured to accept user's setting input and stop of a job under execution, and a communication portion configured to performing data communication with outside, so as to accept a content confirmation input for confirming content of the job to be executed; and a job execution portion operable, for a job for which a content confirmation input has been accepted by the input portion and then an execution instruction has been issued, to execute the job at a predetermined speed with respect to all sheets and, for a job for which no content confirmation input has been accepted by the input portion and then an execution instruction has been issued, to execute the job at a speed lower than the predetermined speed with respect to a predetermined number of sheets starting with a first sheet and at the predetermined speed with respect to remaining sheets;

wherein:

the job execution portion includes a document reader configured to automatically feed set document sheets one by one so as to read the document sheets and to generate image data, the operation portion includes a display portion, accepts a transmission job execution instruction based on image data of the document sheets read by the document reader and content of setting by the operation portion, and accepts a preview display instruction as the content confirmation input, when the operation portion accepts the preview display instruction, the document reader reads the document sheets, and the display portion displays a second preview image indicating content of image data transmitted based on the image data of the document sheets read by the document reader before starting the transmission job execution and the content of setting by the operation portion, when the operation portion accepts the transmission job execution instruction, the display portion displays the second preview image based on the image data of the document sheets read by the document reader and the content of setting by the operation portion, and the document reader reads all pages of the document sheets at a first read speed for a transmission job for which the second preview image is displayed before starting the transmission job execution, while reads a predetermined number of read sheets from first at a second read speed and reads remaining pages of the document sheets at the first read speed for a transmission job for which the second preview image is not displayed before starting the transmission job execution, and the first read speed is faster than the second read speed.

* * * * *